(12) United States Patent
Yagi

(10) Patent No.: US 10,242,172 B2
(45) Date of Patent: Mar. 26, 2019

(54) AUTHENTICATION DEVICE, AUTHENTICATION SYSTEM, AND AUTHENTICATION METHOD

(71) Applicant: RENESAS ELECTRONICS CORPORATION, Tokyo (JP)

(72) Inventor: Hiroshi Yagi, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 33 days.

(21) Appl. No.: 15/428,345

(22) Filed: Feb. 9, 2017

(65) Prior Publication Data
US 2017/0235932 A1   Aug. 17, 2017

(30) Foreign Application Priority Data

Feb. 15, 2016   (JP) ................................ 2016-026050

(51) Int. Cl.
*G06F 21/32*   (2013.01)
*G06F 21/45*   (2013.01)

(52) U.S. Cl.
CPC .............. *G06F 21/32* (2013.01); *G06F 21/45* (2013.01)

(58) Field of Classification Search
CPC ................................. G06F 21/32; G06F 21/45
See application file for complete search history.

(56) References Cited

U.S. PATENT DOCUMENTS

| 8,417,001 | B2* | 4/2013 | Niinuma | G06K 9/0012 324/658 |
| 2007/0237367 | A1* | 10/2007 | Yamato | G06K 9/00221 382/118 |
| 2007/0294540 | A1* | 12/2007 | Wadayama | G06Q 20/341 713/186 |

(Continued)

FOREIGN PATENT DOCUMENTS

JP   2012-212362 A   11/2012

OTHER PUBLICATIONS

Vitabile et. al., "A Self-Contained Biometric Sensor for Ubiquitous Authentication", 2007, IEEE, pp. 289-294. (Year: 2007).*

*Primary Examiner* — Matthew Smithers
(74) *Attorney, Agent, or Firm* — McDermott Will & Emery LLP

(57) ABSTRACT

To provide an authentication device capable of performing authentication accurately even when biological information changes with time. An authentication device (1) includes an acquisition unit (2) configured to acquire biological information about a user; an authentication processing unit (4); a storage unit (6) configured to store standard biological information and basic biological information; and a standard biological information updating unit (8). When a difference between the standard biological information and current biological information is less than a first threshold, the authentication processing unit (4) determines that authentication is established. When the authentication is established by the authentication processing unit (4), the standard bio- (Continued)

logical information updating unit (8) updates the standard biological information according to the current biological information for which the authentication is established, based on the basic biological information and a second threshold.

20 Claims, 21 Drawing Sheets

(56) References Cited

U.S. PATENT DOCUMENTS

| | | | | |
|---|---|---|---|---|
| 2008/0077359 A1* | 3/2008 | Ito | ............................ | G06F 21/32 |
| | | | | 702/187 |
| 2010/0148922 A1* | 6/2010 | Yamada | ................... | G06F 21/32 |
| | | | | 340/5.82 |
| 2012/0255875 A1* | 10/2012 | Vicente | .................. | A61B 5/002 |
| | | | | 205/782 |
| 2012/0291111 A1* | 11/2012 | Kamakura | .............. | G06F 21/32 |
| | | | | 726/7 |
| 2016/0197917 A1* | 7/2016 | Lee | ......................... | H04W 4/80 |
| | | | | 726/7 |
| 2017/0103195 A1* | 4/2017 | Yu | ............................ | G06F 21/32 |

* cited by examiner

AUTHENTICATION DEVICE, AUTHENTICATION SYSTEM, AND AUTHENTICATION METHOD

CROSS-REFERENCE TO RELATED APPLICATIONS

This application is based upon and claims the benefit of priority from Japanese patent application No. 2016-026050, filed on Feb. 15, 2016, the disclosure of which is incorporated herein in its entirety by reference.

BACKGROUND

The present invention relates to an authentication device, an authentication system, and an authentication method. For example, the present invention relates to an authentication device, an authentication system, and an authentication method that perform authentication using biological information.

Biometric authentication using biological information has been employed in many cases as a method for identifying an individual. Biological information is unique to each individual. In other words, biological information about one person will be different from biological information about another person. Specific examples of biological information include electrocardiogram information, fingerprint information, iris information, retina information, vascular information, face information, and voice information.

The biometric authentication is carried out by comparing registered biological information (standard biological information), which is registered in advance, and biological information (current biological information) which is acquired by a sensor or the like. When the standard biological information and the current biological information are similar, authentication is established, and the individual having the current biological information is authenticated. In this case, it can be judged whether or not the current biological information is similar to the standard biological information by statistical processing.

In particular, biological information about an individual, such as electrocardiogram information, changes daily during the activities of the individual. Japanese Unexamined Patent Application Publication No. 2012-212362 discloses an information processing apparatus capable of carrying out an authentication process, without increasing a false rejection ratio, even in a biometric authentication process using the biological information that changes daily during the activities of the individual. The information processing apparatus disclosed in Japanese Unexamined Patent Application Publication No. 2012-212362 carries out statistical processing on the authenticated biological information by using the authenticated biological information and registered biological information, and expands the registered biological information which is registered in advance based on the statistical processing result.

SUMMARY

The biological information changes in accordance with a natural growth or aging (hereinafter referred to simply as "growth") of a human being. This change is called a secular change of the biological information. On the other hand, it is assumed that the biological information does not greatly change under normal circumstances. Accordingly, the amount of secular change of the biological information in a certain period of time (for example, about several years) can be assumed. However, in the method disclosed in Japanese Unexamined Patent Application Publication No. 2012-212362, even when the biological information changes by an amount exceeding the assumed amount of secular change due to, for example, a temporary illness or intense exercise, the registered biological information is expanded. In such a case, it is difficult for the method disclosed in Japanese Unexamined Patent Application Publication No. 2012-212362 to carry out the authentication accurately.

Other problems to be solved by and novel features of will become apparent from the following description and the accompanying drawings.

According to one embodiment, an authentication device includes: an acquisition unit configured to acquire biological information of a user; an authentication processing unit configured to perform an authentication process by comparing current biological information with standard biological information about the user, the current biological information being the acquired biological information; a storage unit configured to store the standard biological information and basic biological information about the user, the basic biological information being registered in advance; and a standard biological information updating unit configured to perform a process for updating the standard biological information. When a difference between the standard biological information and the current biological information is less than a predetermined first threshold, the authentication processing unit determines that authentication is established. When the authentication is established, the standard biological information updating unit updates the standard biological information according to the current biological information for which the authentication is established, based on the basic biological information and a predetermined second threshold.

According to the one embodiment, the authentication can be accurately performed even when biological information changes with time.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
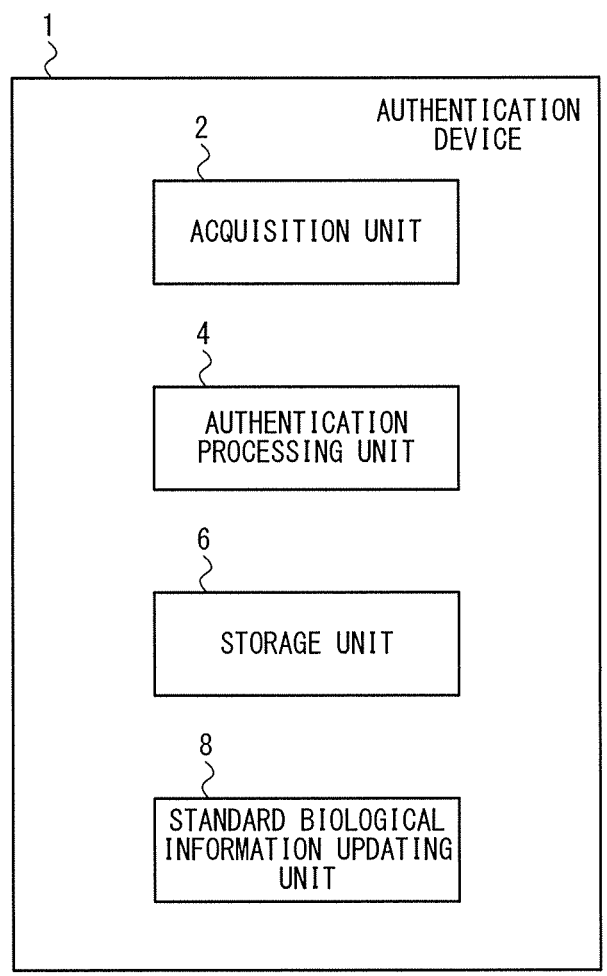
FIG. 1 is a diagram showing an outline of an authentication device according to an embodiment.

Hereinafter, embodiments will be described with reference to the accompanying drawings. For clarity of explanation, the following description and the drawings are abbreviated or simplified as appropriate. The same elements are denoted by the same reference numerals, and repeated descriptions thereof is omitted.

In the following embodiments, explanations are made by referring to several sections or several embodiments for convenience, as required, but they are mutually related, and are in such a relation to each other that one of them is a modified example, an application example, a detailed explanation, a supplemental explanation, or the like of some or all of the other, unless otherwise specified. Further, in the following embodiment, when the number of elements (including the number of items, numerical value, quantity, range, etc.) or the like is mentioned, the number is not limited to that specific number, and may be larger or smaller than the mentioned number, except for the case where it is explicitly indicated that the number should be the specifically-mentioned number or it is theoretically clear that the number should be limited to the specifically-mentioned number.

Further, in the following embodiments, the constituent elements thereof (including operation steps etc.) are not necessarily indispensable, except for the case where it is explicitly indicated that a specific element is indispensable, or it is theoretically clear that a specific element is indispensable. Similarly, in the following embodiments, when shapes, positional relationships, etc. of the constituent elements are mentioned, they include substantially similar or analogous shapes and so forth, except for the case where it is explicitly indicated or it is theoretically clear that the above is not true. This also applies to the above-mentioned values (including the number of items, numerical value, quantity, range, etc.) and the like.

The elements illustrated in the drawings as functional blocks for performing various processes can be implemented hardwarewise by a CPU, a memory, and other circuits, and softwarewise by a program loaded into a memory or the like. Accordingly, it is understood by those skilled in the art that these functional blocks can be implemented in various forms including, but not limited to, hardware alone, software alone, and a combination of hardware and software. Note that in the drawings, the same elements are denoted by the same reference numerals, and a repeated description is omitted as needed.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

Outline of Embodiment

Prior to giving a description of this embodiment, an outline of this embodiment will be described.

FIG. 1 is a diagram showing an outline of an authentication device 1 according to this embodiment. The authentication device 1 authenticates the individual who owns the authentication device 1 by biometric authentication. Preferably, the authentication device 1 may be a portable device that can be carried by the individual to be authenticated.

The authentication device 1 includes an acquisition unit 2, an authentication processing unit 4, a storage unit 6, and a standard biological information updating unit 8. The acquisition unit 2 acquires biological information about a user who carries the authentication device 1. The term "biological information" used herein refers to data for authentication in a biometric authentication process. The acquisition unit 2 may include a sensor or the like for detecting a biological signal, or may include a sensor or the like, an arithmetic device for generating biological information, which is converted into a numerical value used for biometric authentication, from the biological signal detected by the sensor, and a memory. Further, the acquisition unit 2 may be configured to acquire biological information from a sensor or an arithmetic device which is provided outside of the authentication device 1.

The authentication processing unit 4 performs authentication by comparing standard biological information with the biological information acquired by the acquisition unit 2. The authentication processing unit 4 may be composed of, for example, an arithmetic device and a memory. The biological information acquired by the acquisition unit 2 is herein referred to as current biological information. The standard biological information is biological information based on which biologic authentication is performed. In other words, the standard biological information indicates the characteristics of an individual living body to be authenticated during the authentication process.

As a result of comparing the current biological information with the standard biological information, when the current biological information is similar to the standard biological information, the authentication processing unit 4 determines that the authentication of the individual is established. Specifically, when the difference between the standard biological information and the current biological information is less than a predetermined first threshold, the authentication processing unit 4 determines that the authentication is established.

The storage unit 6 may be composed of a storage device, such as a memory. The storage unit 6 stores the standard biological information and basic biological information which is registered in advance. In this case, the basic biological information is the biological information about an individual that is registered when the individual starts using the authentication device 1. Note that the initial value of the standard biological information is set to the basic biological information. The value indicated by the current biological information, the value indicated by the standard biological information, and the value indicated by the basic biological information may be referred to as a current value, a standard value, and a basic value, respectively.

The standard biological information updating unit 8 performs a process for updating the standard biological information. While the initial value of the standard biological information is set to the basic biological information, the standard biological information can be updated in accordance with a change in the current biological information. At this time, when the authentication is established by the authentication processing unit 4, the standard biological information updating unit 8 updates the standard biological information according to the current biological information for which the authentication is established, based on the basic biological information and a predetermined second threshold.

Specifically, when the authentication is established, the standard biological information updating unit 8 updates the standard biological information with the current biological information for which the authentication is established, based on the comparison between the second threshold and at least one of the difference between the basic biological information and the current biological information and the difference between the basic biological information and the standard biological information. More specifically, when the difference between the basic biological information and the current biological information is less than the second threshold, or when the difference between the basic biological information and the standard biological information is less than the second threshold, the standard biological information updating unit 8 updates the standard biological information with the current biological information for which the authentication is established. Alternatively, when the difference between the basic biological information and the current biological information is less than the second threshold, the standard biological information updating unit 8 updates the standard biological information with the current biological information for which the authentication is established.

The authentication device 1 according to this embodiment updates the standard biological information with the current biological information for which the authentication is established, thereby updating the standard biological information in accordance with a daily change of the biological information. Accordingly, an increase in the false rejection ratio due to a change in the biological information of an individual can be suppressed. Further, the authentication device 1 according to this embodiment updates the standard biological information based on the comparison between the second threshold and at least one of the difference between the basic biological information and the current biological information and the difference between the basic biological information and the standard biological information. This prevents the standard biological information from being substantially different from the basic biological information even when the standard biological information is updated. In other words, the standard biological information can be updated within a range in which the standard biological information does not substantially differ from the basic biological information. That is, since the standard biological information is not updated when the biological information changes by an amount exceeding the assumed amount of secular change in a certain period of time, the deterioration in the accuracy of the authentication can be suppressed. Therefore, the authentication device 1 according to this embodiment can perform authentication accurately even when the biological information changes with time.

First Embodiment

Next, a first embodiment will be described.

Figure 2:
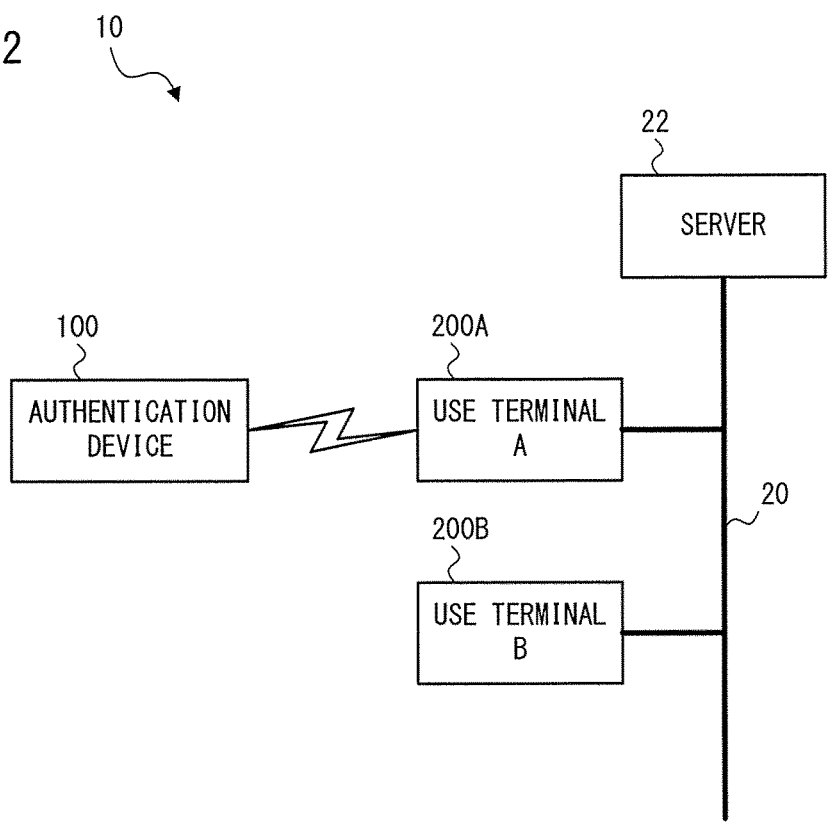
FIG. 2 is a diagram showing an authentication system according to a first embodiment.

FIG. 2 is a diagram showing an authentication system 10 according to the first embodiment. The authentication system 10 includes an authentication device 100, a network 20, a server 22, and use terminals 200A and 200B. The server 22, the use terminal 200A, and the use terminal 200B are connected to each other in such a manner that they can communicate with each other via the network 20. The network 20 is a wired or wireless communication network. The server 22 provides services to the use terminal 200 in response to a request from the use terminal 200. Accordingly, the use terminal 200 provides the user with services.

When the use terminal 200A and the use terminal 200B are described without distinguishing them from each other, they are referred to as the use terminal 200. The number of the use terminals 200 is not limited to two. The number of the use terminals 200 may be one, or three or more. The use terminal 200A and the use terminal 200B may have substantially the same hardware configuration.

The authentication device 100 corresponds to the authentication device 1 shown in FIG. 1. The authentication device 100 is a device that authenticates the user of the authentication device 100. The authentication device 100 is preferably a device that is carried by the user who is the owner of the authentication device 100. For example, the authentication device 100 may be incorporated in a mobile terminal, such as a smartphone or a cellular phone. More preferably, the authentication device 100 may be a wearable device which can be attached to an arm of the user or the head of the user. In this case, the authentication device 100 may be incorporated in a watch, a wristband, glasses, clothes, or the like.

The use terminal 200 functions as an opposing device of the authentication device 100. When the authentication of the user is established by the authentication device 100, the use terminal 200 can be used by the user. In this case, the use terminal 200 connects to the network 20 to request the server 22 to provide a service. The use terminal 200 provides the user with the service which is provided from the server 22. Thus, the user can be provided with the service.

Figure 3:
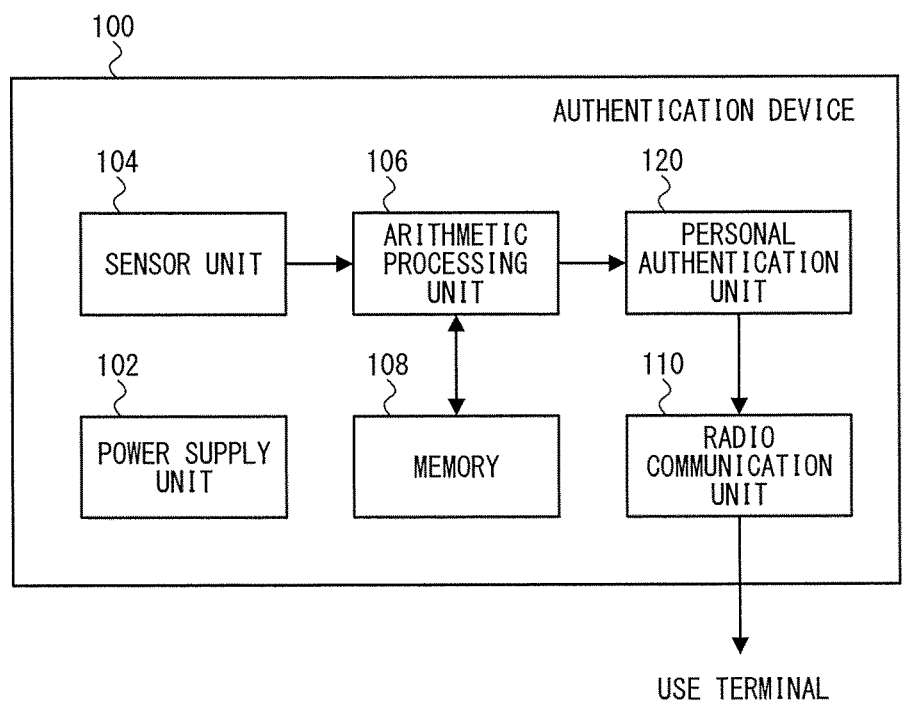
FIG. 3 is a diagram showing an authentication device according to the first embodiment.

FIG. 3 is a diagram showing the authentication device 100 according to the first embodiment. The authentication device 100 includes a power supply unit 102, a sensor unit 104, an arithmetic processing unit 106, a memory 108, a radio communication unit 110, and a personal authentication unit 120. The power supply unit 102 is, for example, a battery. The power supply unit 102 supplies electric power necessary for each component of the authentication device 100 to operate. The power supply unit 102 may have a charging function.

The sensor unit 104 detects a biological signal from the user of the authentication device 100. The sensor unit 104 outputs the detected biological signal to the arithmetic processing unit 106. For example, when the biological information used for biometric authentication is electrocardiogram information, the sensor unit 104 may be an electrocardiograph. In this case, the sensor unit 104 detects an electrocardiographic waveform (electric information) as a biological signal. An example in which electrocardiogram information is used as the biological information will be described, but the biological information is not limited to electrocardiogram information.

The arithmetic processing unit 106 uses the memory 108 to generate electrocardiogram information (biological information) used for biometric authentication from an electrocardiographic waveform (biological signal) detected by the sensor unit 104. The arithmetic processing unit 106 outputs the generated biological information (current biological information) to the personal authentication unit 120. The arithmetic processing unit 106 is, for example, an arithmetic processor such as a CPU. The memory 108 can be configured to store a program for generating the electrocardiogram information (biological information), or temporarily store data in the process of generating the biological information. An example in which electrocardiogram information is generated from an electrocardiographic waveform will be described below, but the method of generating the electrocardiogram information from an electrocardiographic waveform is not limited to the following example.

Figure 4:
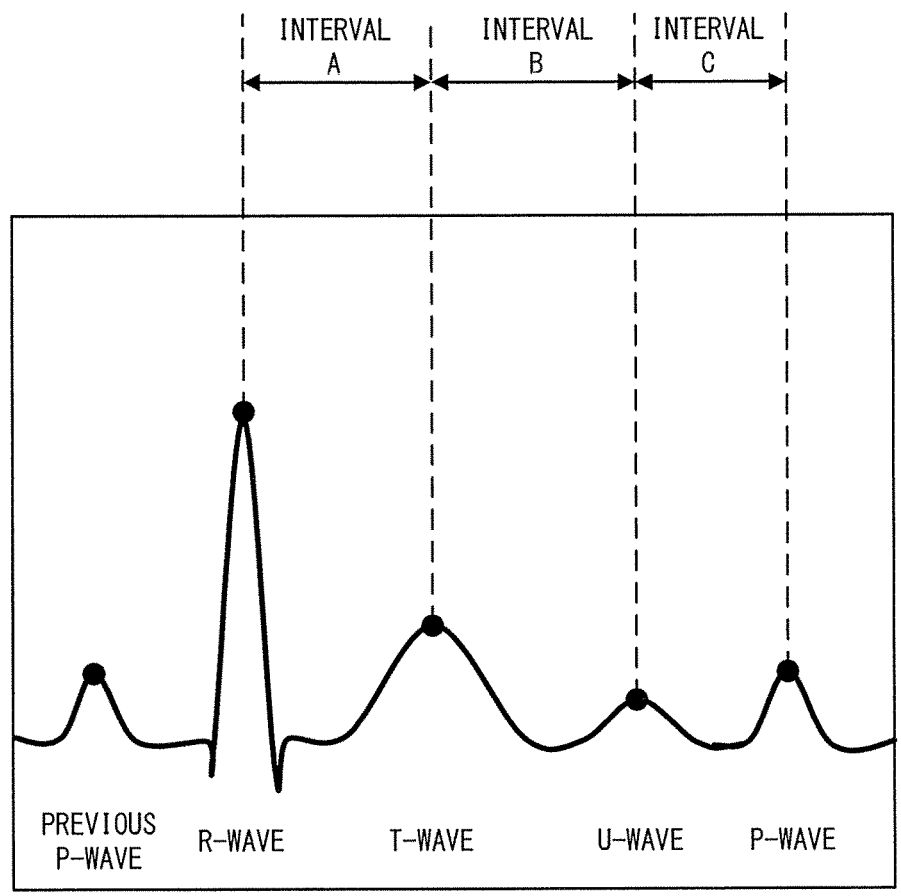
FIG. 4 is a diagram for explaining a method for generating biological information according to the first embodiment.

FIG. 4 is a diagram for explaining a method for generating the biological information according to the first embodiment. FIG. 4 illustrates the electrocardiographic waveform (electrocardiogram) detected by the sensor unit 104. In FIG. 4, the horizontal axis represents time and the vertical axis represents the magnitude of the electric signal.

The arithmetic processing unit 106 determines each peak point of an R-wave, a T-wave, a U-wave, and a P-wave in the electrocardiographic waveform. Specifically, for example, the arithmetic processing unit 106 differentiates a measured value and determines, as a peak point, a point where the differential value (inclination) is zero. Note that the arithmetic processing unit 106 may determine, as a peak point, a point where the differential value has passed zero during sampling. Further, the arithmetic processing unit 106 determines, as the peak point of the R-wave, the peak point where the value of electric information is highest among the peak points (or the value of electric information exceeds a certain threshold). Further, the arithmetic processing unit 106 determines, as the peak point of the T-wave, the peak point subsequent to the peak point of the R-wave, determines, as the peak point of the U-wave, the peak point subsequent to the peak point of the T-wave, and determines, as the peak point of the P-wave, the peak point subsequent to the peak point of the U-wave. Further, the arithmetic processing unit 106 calculates an interval A as a time interval between the peak point of the R-wave and the peak point of the T-wave; an interval B as a time interval between the peak point of the T-wave and the peak point of the U-wave; and an interval C as a time interval between the peak point of the U-wave and the peak point of the P-wave. Further, the arithmetic processing unit 106 generates the ratio among the interval A, the interval B, and the interval C (interval A:interval B:interval C) as the biological information (current biological information).

The personal authentication unit 120 authenticates the user by using the current biological information acquired from the arithmetic processing unit 106. When the authentication of the user is established (authentication OK), the personal authentication unit 120 outputs an authentication completion notification including key information generated from the identification information of the user to the radio communication unit 110. The personal authentication unit 120 may be composed of, for example, an arithmetic device and a memory. The configuration of the personal authentication unit 120 will be described later.

The radio communication unit 110 transmits the authentication completion notification including the key information by radio transmission to the use terminal 200 that is desired to be used by the user. Upon receiving the authentication completion notification (key information) from the authentication device 100, the use terminal 200 acquires the identification information of the user from the key information. Further, the use terminal 200 performs a process for allowing the user to use the operation terminal 200 by using the identification information of the user. This process allows the user to use the use terminal 200.

Figure 5:
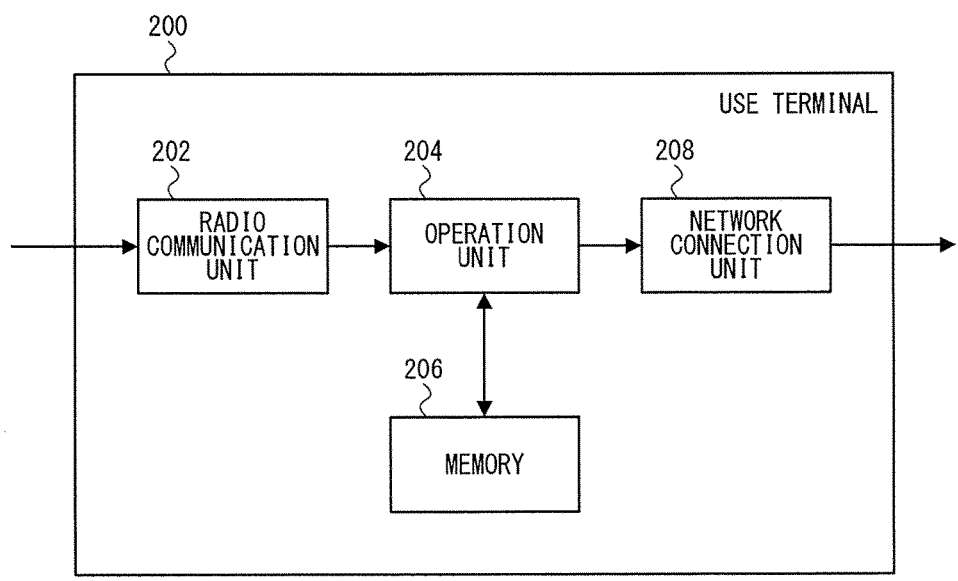
FIG. 5 is a diagram showing a configuration of a use terminal according to the first embodiment.

FIG. 5 is a diagram showing the configuration of the use terminal 200 according to the first embodiment. The use terminal 200 includes a radio communication unit 202, an operation unit 204, a memory 206, and a network connection unit 208. The radio communication unit 202 receives the key information from the authentication device 100, and outputs the key information to the operation unit 204.

The operation unit 204 is, for example, an arithmetic processor such as a CPU. The memory 206 can be configured to store a program for decoding the key information, or temporarily store data in the process of decoding the key information. Further, the operation unit 204 controls the operation of the network connection unit 208. Specifically, the operation unit 204 decodes the key information by using the memory 206, and acquires the identification information of the user. The operation unit 204 outputs the identification information of the user to the network connection unit 208. Upon receiving the identification information of the user, the network connection unit 208 performs a process for connecting to the network 20. Further, the network connection unit 208 performs a process for requesting the server 22 to provide a service. Specifically, the network connection unit 208 transmits the identification information of the user to the server 22 via the network 20. The server 22 provides the use terminal 200 with the service corresponding to the received identification information via the network 20. This process enables the user to receive the service by using the use terminal 200.

An authentication method for the authentication device 100 will be described in detail below.

Figure 6:
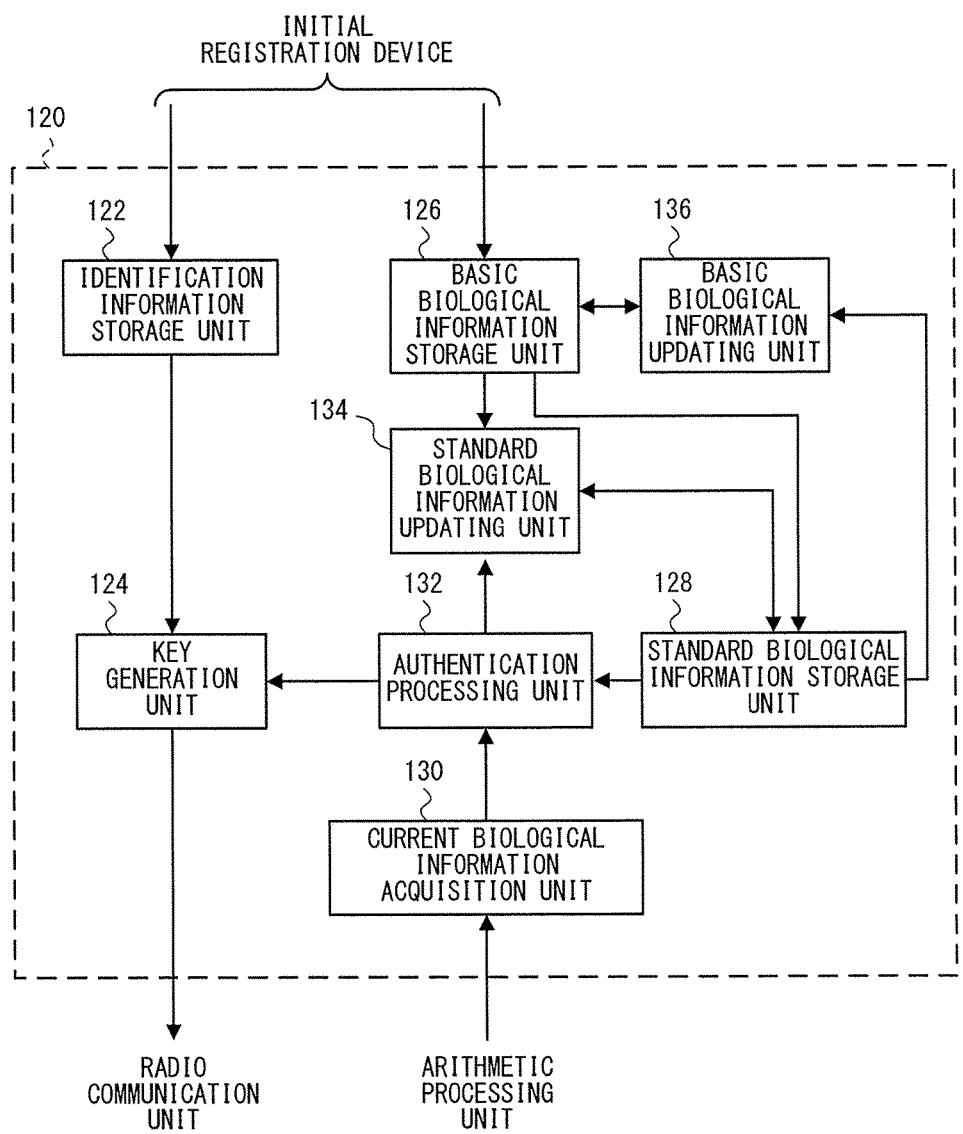
FIG. 6 is a diagram showing a configuration of a personal authentication unit according to the first embodiment.

FIG. 6 is a diagram showing the configuration of the personal authentication unit 120 according to the first embodiment. The personal authentication unit 120 includes an identification information storage unit 122, a key generation unit 124, a basic biological information storage unit 126, a standard biological information storage unit 128, a current biological information acquisition unit 130, an authentication processing unit 132, a standard biological information updating unit 134, and a basic biological information updating unit 136.

The identification information storage unit 122 stores the identification information (ID) of the user. The identification information is information necessary for the user to receive services from the server 22. The identification information of the user can be registered using, for example, an initial registration device (not shown) when the user starts using the authentication device 100. The identification information may be text data composed of, for example, a plurality of alphanumeric characters. If the authentication device 100 has a function (such as a keyboard) for inputting the identification information, the user may register the function without using the initial registration device.

When authentication is established by the authentication processing unit 132 as described later, the key generation unit 124 generates key information from the identification information. The key generation unit 124 outputs the generated key information (or the authentication completion notification including the key information) to the radio communication unit 110. In other words, when authentication is not established, the key generation unit 124 does not output the key information to the radio communication unit 110.

Specifically, when the user is authenticated, the key generation unit 124 receives an enabling signal indicating that authentication is established from the authentication processing unit 132. Upon receiving the enabling signal, the key generation unit 124 extracts the identification information from the identification information storage unit 122. The key generation unit 124 encrypts the identification information to generate the key information. Note that any method can be employed as the encryption method.

The basic biological information storage unit 126 stores basic biological information. The basic biological information can be registered by, for example, the initial registration device, when the user starts using the authentication device 100. Note that the basic biological information can be registered without using the initial registration device. For example, when the authentication device 100 is started to use, the basic biological information storage unit 126 may store the biological information, which is acquired using the sensor unit 104 and the arithmetic processing unit 106, as the basic biological information. The standard biological information storage unit 128 stores the standard biological information. When the user starts using the authentication device 100, that is, in the initial state, the standard biological information matches the basic biological information. In other words, in the initial state, the standard biological information storage unit 128 stores the basic biological information as the standard biological information. Note that as described later, in this embodiment, the standard biological information can be updated at a relatively short time interval (for example, at a timing when authentication is necessary, or every several hours). On the other hand, the basic biological information can be updated at a relatively long time interval (for example, every several years). As long as the interval of updating the standard biological information is shorter than the interval of updating the basic biological information, the interval of updating the standard biological information and the basic biological information need not necessarily be constant.

The current biological information acquisition unit 130 acquires the current biological information from the arithmetic processing unit 106. The current biological information acquisition unit 130 outputs the acquired current biological information to the authentication processing unit 132. The current biological information acquisition unit 130 may acquire the current biological information at any timing when the authentication is necessary (for example, when the authentication device 100 approaches the use terminal 200), or may acquire the current biological information at a predetermined time interval. In this embodiment, the current biological information is acquired every predetermined period Ta, and thus the authentication is performed every period Ta. The period Ta is, for example, several hours, but the period Ta is not limited to several hours.

The authentication processing unit 132 extracts the standard biological information from the standard biological information storage unit 128. Further, the authentication processing unit 132 compares the current biological information with the standard biological information to thereby authenticate the user. This process will be described in detail later. When the authentication is established, the authentication processing unit 132 outputs the current biological information for which the authentication is established to the standard biological information updating unit 134. Further, when the authentication is established, the authentication processing unit 132 outputs the enabling signal to the key generation unit 124.

The standard biological information updating unit 134 updates the standard biological information according to the current biological information. When the standard biological information updating unit 134 accepts the current biological information for which the authentication is established, that is, when the authentication is established, the standard biological information updating unit 134 extracts the basic biological information from the basic biological information storage unit 126. Further, the standard biological information updating unit 134 updates the standard biological information by using the basic biological information and the current biological information. This process will be described in detail later.

The basic biological information updating unit 136 updates the basic biological information every period Tb, which is much longer than the period Ta, according to the standard biological information. The period Tb is, for example, several years, but is not limited to several years. At this time, the basic biological information updating unit 136 updates the basic biological information by using the standard biological information extracted from the standard biological information storage unit 128. This process will be described in detail later.

Figure 7:
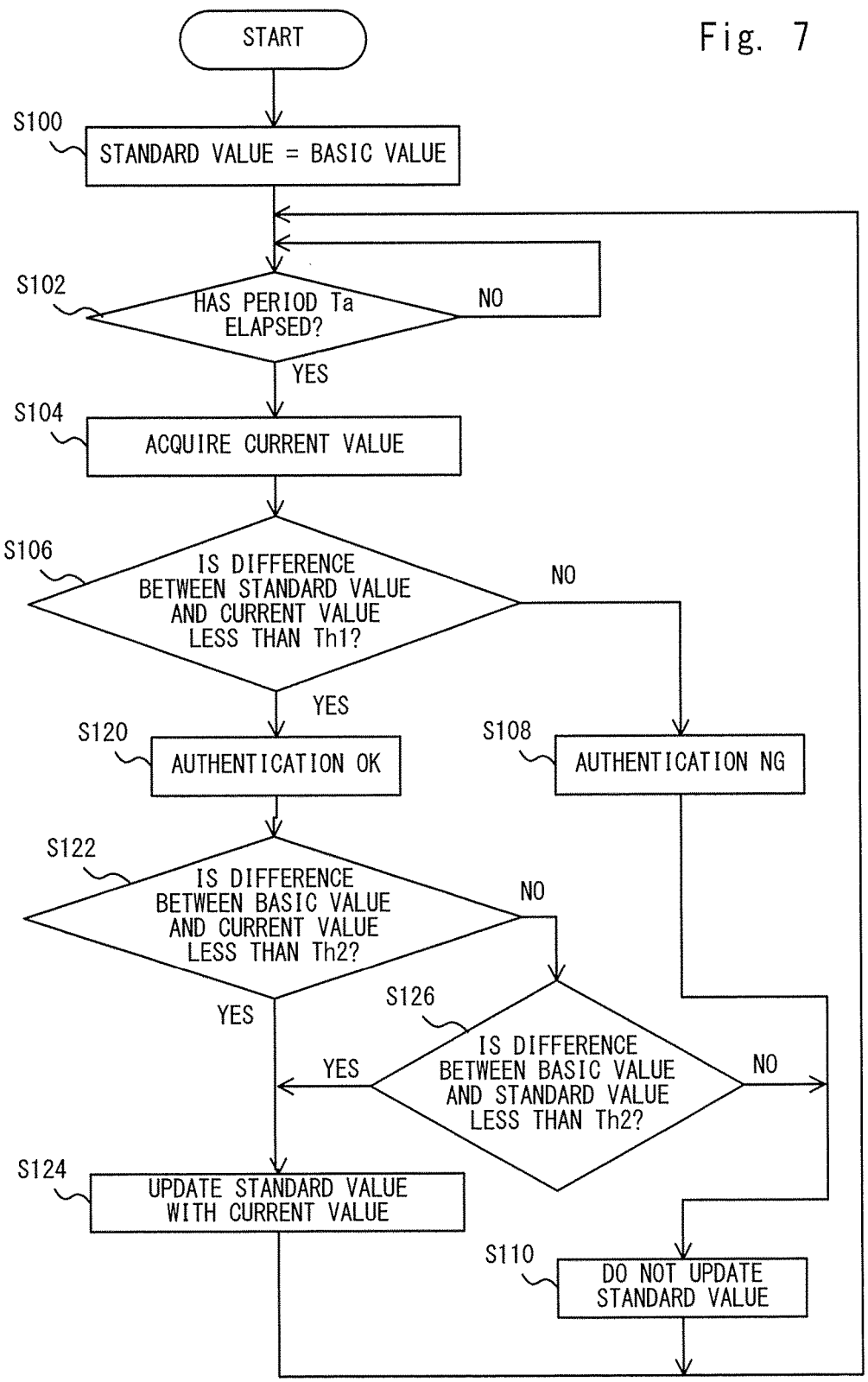
FIG. 7 is a flowchart showing an authentication process and a standard biological information updating process which are performed by the personal authentication unit according to the first embodiment.

FIG. 7 is a flowchart showing the authentication process and the process of updating the standard biological information by the personal authentication unit 120 according to the first embodiment. First, in the initial state, the personal authentication unit 120 sets the standard biological information (standard value) as the basic biological information (basic value) (step S100). Next, after a lapse of the period Ta from the previous authentication process (YES in step S102), the current biological information acquisition unit 130 acquires the current biological information (current value) (step S104). Note that in the first authentication process, the term "previous authentication process" may indicate the initial registration of the basic value.

Next, the authentication processing unit 132 determines whether or not the difference between the standard value and the current value is less than a predetermined threshold Th1 (first threshold) (step S106). When the difference between the standard value and the current value is not less than the threshold Th1 (NO in S106), the authentication processing unit 132 determines that the authentication is not established (authentication NG) (step S108). In this case, the standard biological information updating unit 134 does not update the standard value (S110).

On the other hand, when the difference between the standard value and the current value is less than the threshold Th1 (YES in S106), the authentication processing unit 132 determines that the authentication is established (authentication OK) (step S120). In this case, as described above, the key generation unit 124 generates the key information from the identification information of the user, and outputs the key information to the radio communication unit 110.

In this case, the threshold Th1 corresponds to an authenticatable range in which the current value is considered to be similar to the standard value by a statistical process. In other words, when the current value falls within the range from the standard value to the threshold Th1, that is, when the current value falls within the range of standard value ±Th1, it is determined that the authentication is established. As the threshold Th1 increases, the false rejection ratio decreases, but the false acceptance ratio at which one person is falsely recognized as another person increases. In other words, as the threshold Th1 decreases, the false acceptance ratio decreases, but the false rejection ratio increases.

Further, when the authentication is established, the standard biological information updating unit 134 determines whether the difference between the basic value and the current value is less than a predetermined threshold Th2 (step S122). When the difference between the basic value and the current value is less than the threshold Th2 (YES in S122), the standard biological information updating unit 134 updates the standard value (standard biological information) with the current value (current biological information) (step S124). In other words, the standard biological information updating unit 134 overwrites the standard value with the current value. As a result, the standard value becomes equal to the current value.

On the other hand, when the difference between the basic value and the current value is not less than the threshold Th2 (NO in S122), the standard biological information updating unit 134 determines whether the difference between the basic value and the standard value is less than the threshold Th2 (step S126). When the difference between the basic value and the standard value is less than the threshold Th2 (YES in S126), the standard biological information updating unit 134 updates the standard value with the current value (step S124). On the other hand, when the difference between the basic value and the standard value is not less than the threshold Th2 (NO in S126), the standard biological information updating unit 134 does not update the standard value (step S110).

In this case, the threshold Th2 corresponds to a growth following range in which the biological information can be changed overtime in the period Tb due to the normal growth of the user. In other words, if the secular change of the biological information is normal, it is estimated that the biological information falls within the range from the basic value to the threshold Th2, that is, within the range of the basic value ±Th2. On the other hand, the secular change of the biological information is abnormal due to, for example, a temporary illness of the user, the biological information may deviate from the range of the basic value ±Th2. Since the authenticatable range is smaller than the growth following range, the threshold Th1 is smaller than the threshold Th2.

Figure 8:
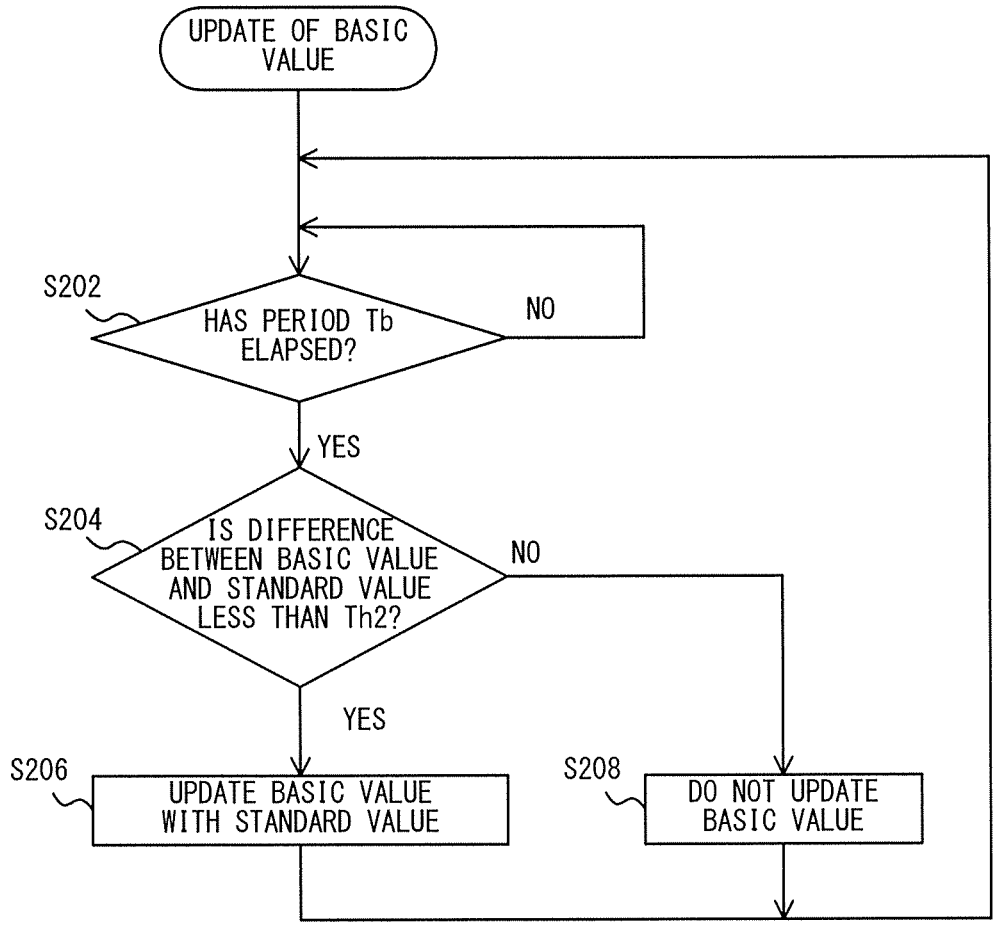
FIG. 8 is a flowchart showing a basic biological information updating process performed by the personal authentication unit according to the first embodiment.

FIG. 8 is a flowchart showing the process of updating the basic biological information by the personal authentication unit 120 according to the first embodiment. When the period Tb has elapsed from the previous update process for the basic value (YES in step S202), the basic biological information updating unit 136 determines whether the difference between the basic value and the standard value is less than the threshold Th2 (step S204). The term "previous update" in the first update process for the basic value indicates the initial registration of the basic value.

When the difference between the basic value and the standard value is less than the threshold Th2 (YES in S204), the basic biological information updating unit 136 updates the basic value (basic biological information) with the standard value (standard biological information) (step S206). In other words, the basic biological information updating unit 136 overwrites the basic value with the standard value. As a result, the basic value becomes equal to the standard value. On the other hand, when the difference between the basic value and the standard value is not less than the threshold Th2 (NO in S204), the basic biological information updating unit 136 does not update the basic value (step S208).

In FIG. 8, the process returns from the process of S208 to the process of S202. In other words, when the basic value is not updated after the lapse of the period Tb, it is determined to be "YES" in the process of S202 subsequent to the process of S208. Accordingly, the difference between the current value and the basic value becomes less than the threshold Th2 due to a change in the biological information (S122), the standard value is updated with the current value (S124), so that the difference between the basic value and the standard value may be less than the threshold Th2. At this time, the basic biological information updating unit 136 can update the basic value.

Next, a specific example of the process of updating the standard biological information and the basic biological information will be described.

Figure 9:
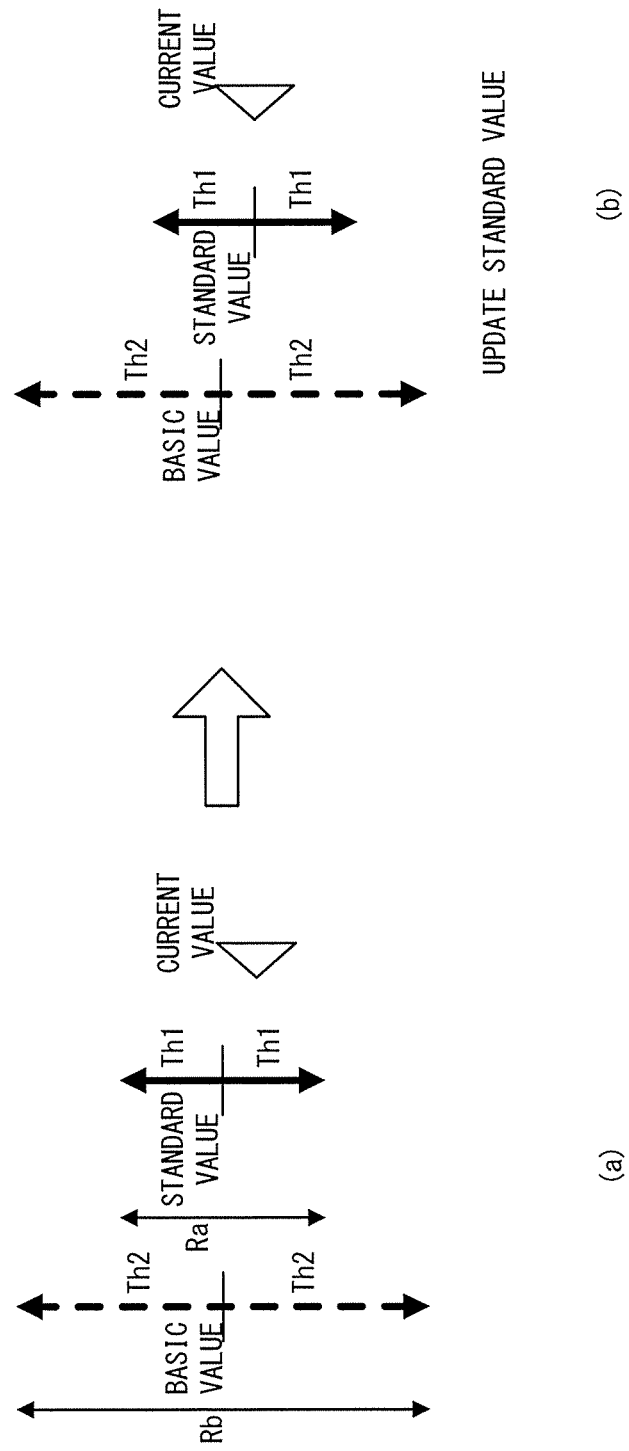
FIG. 9 is a diagram for explaining a standard biological information updating process performed by a standard biological information updating unit according to the first embodiment.
Figure 10:
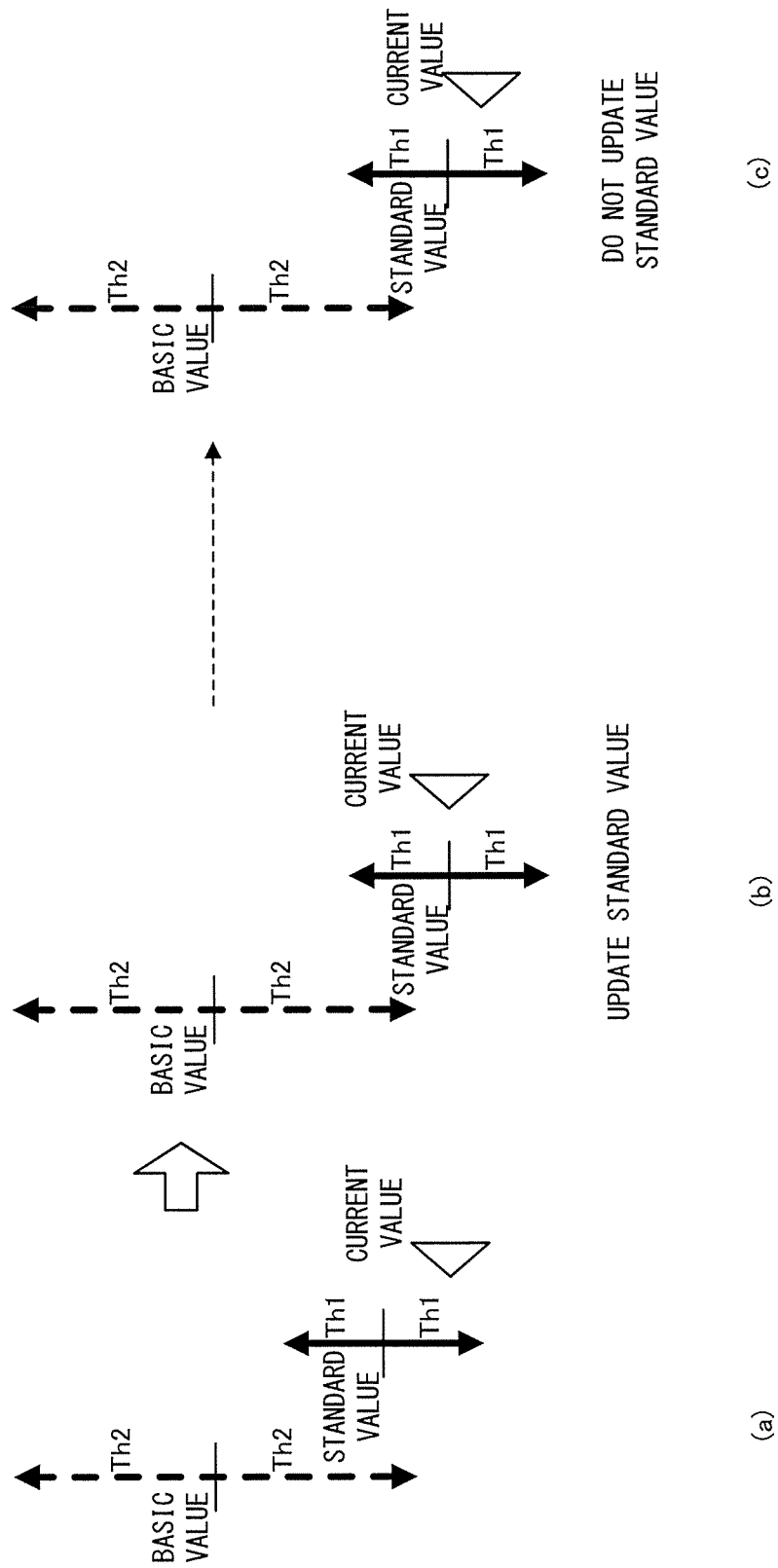
FIG. 10 is a diagram for explaining a standard biological information updating process performed by the standard biological information updating unit according to the first embodiment.
Figure 11:
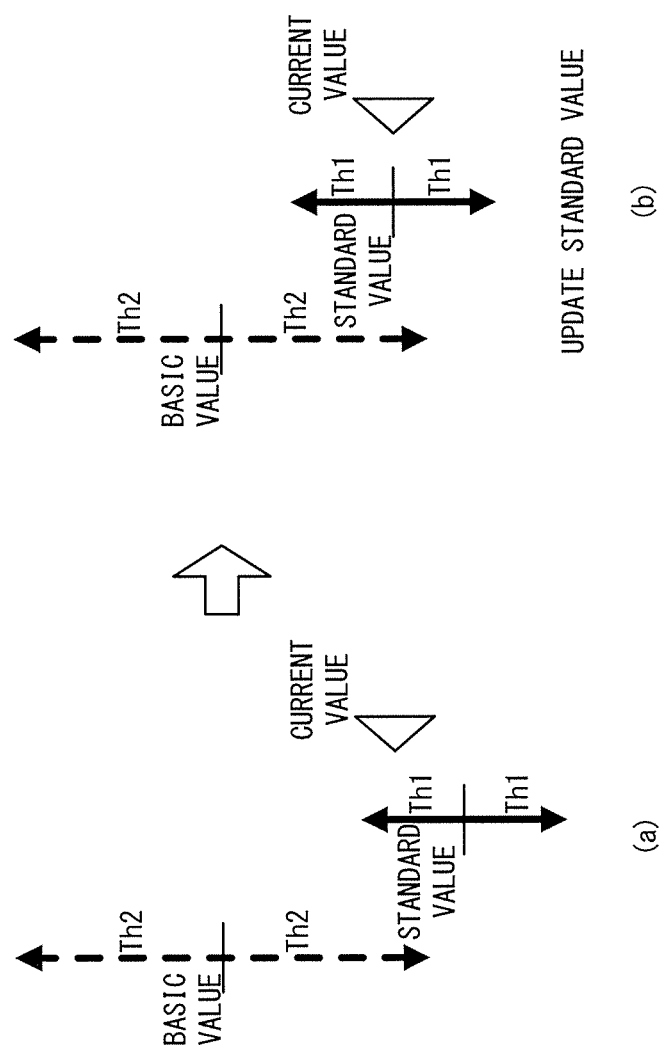
FIG. 11 is a diagram for explaining the standard biological information updating process performed by the standard biological information updating unit according to the first embodiment.
Figure 12:
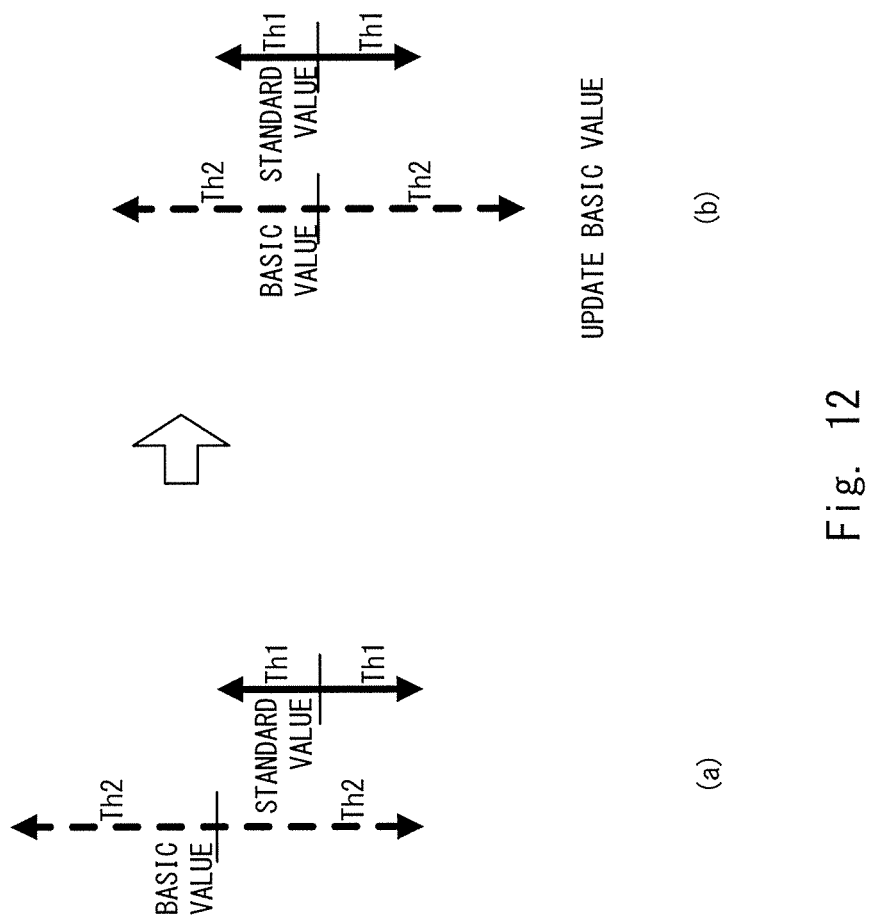
FIG. 12 is a diagram for explaining the basic biological information updating process performed by the basic biological information updating unit according to the first embodiment.
Figure 13:
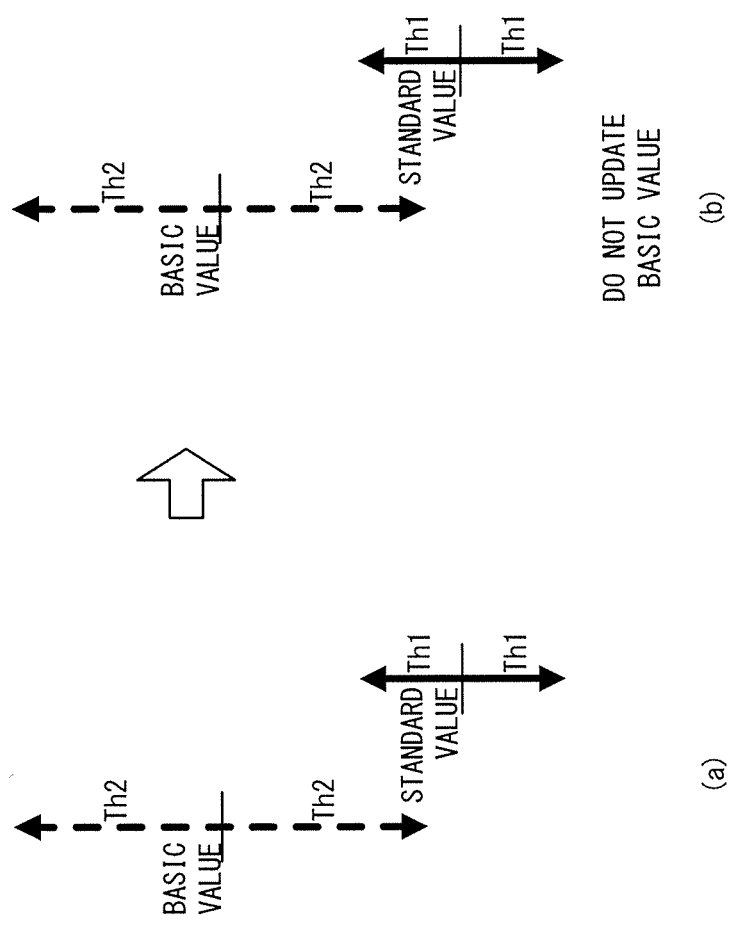
FIG. 13 is a diagram for explaining the basic biological information updating process performed by the basic biological information updating unit according to the first embodiment.
Figure 14:
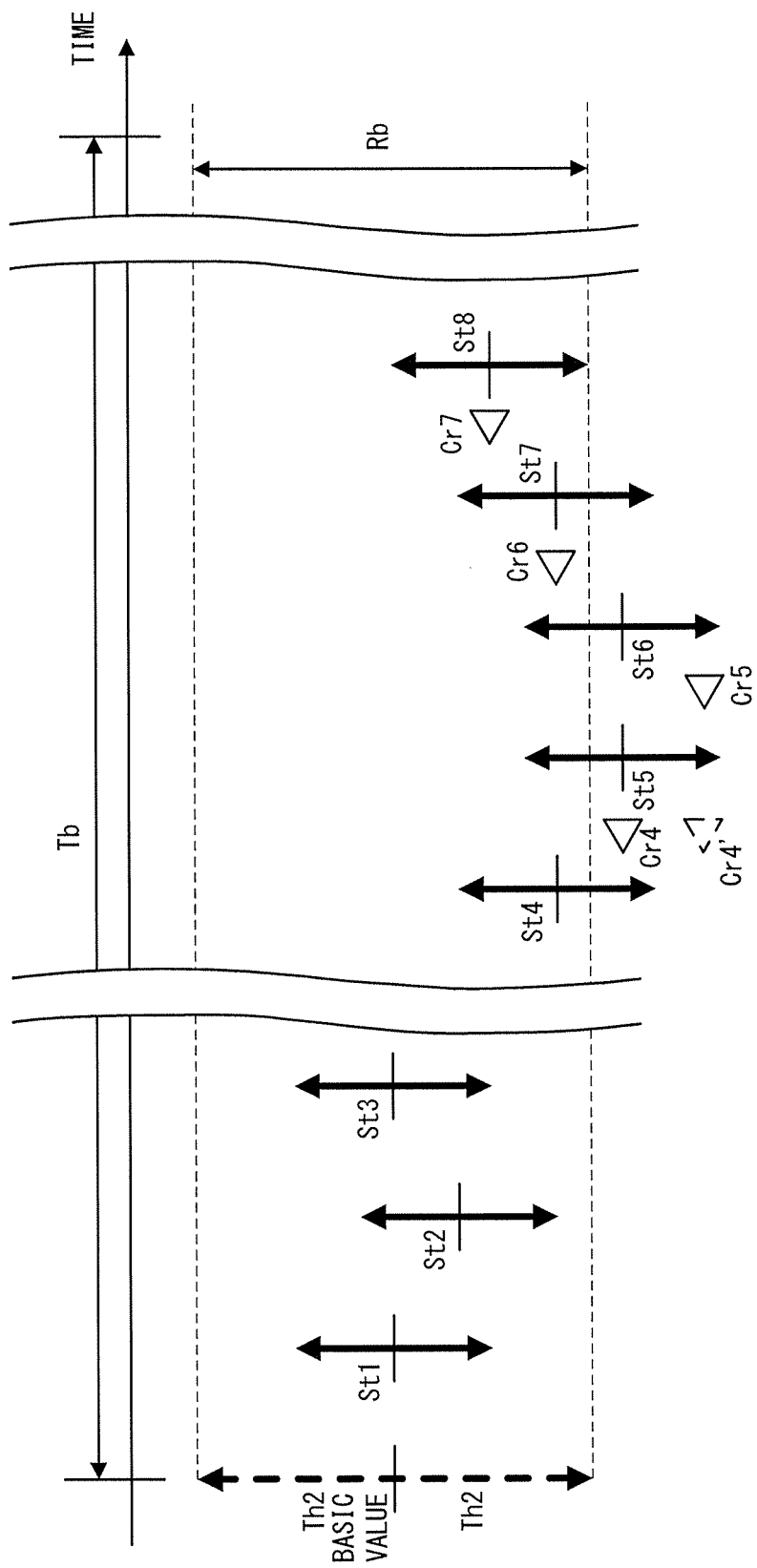
FIG. 14 is a diagram illustrating a change in the standard biological information according to the first embodiment.
Figure 15:
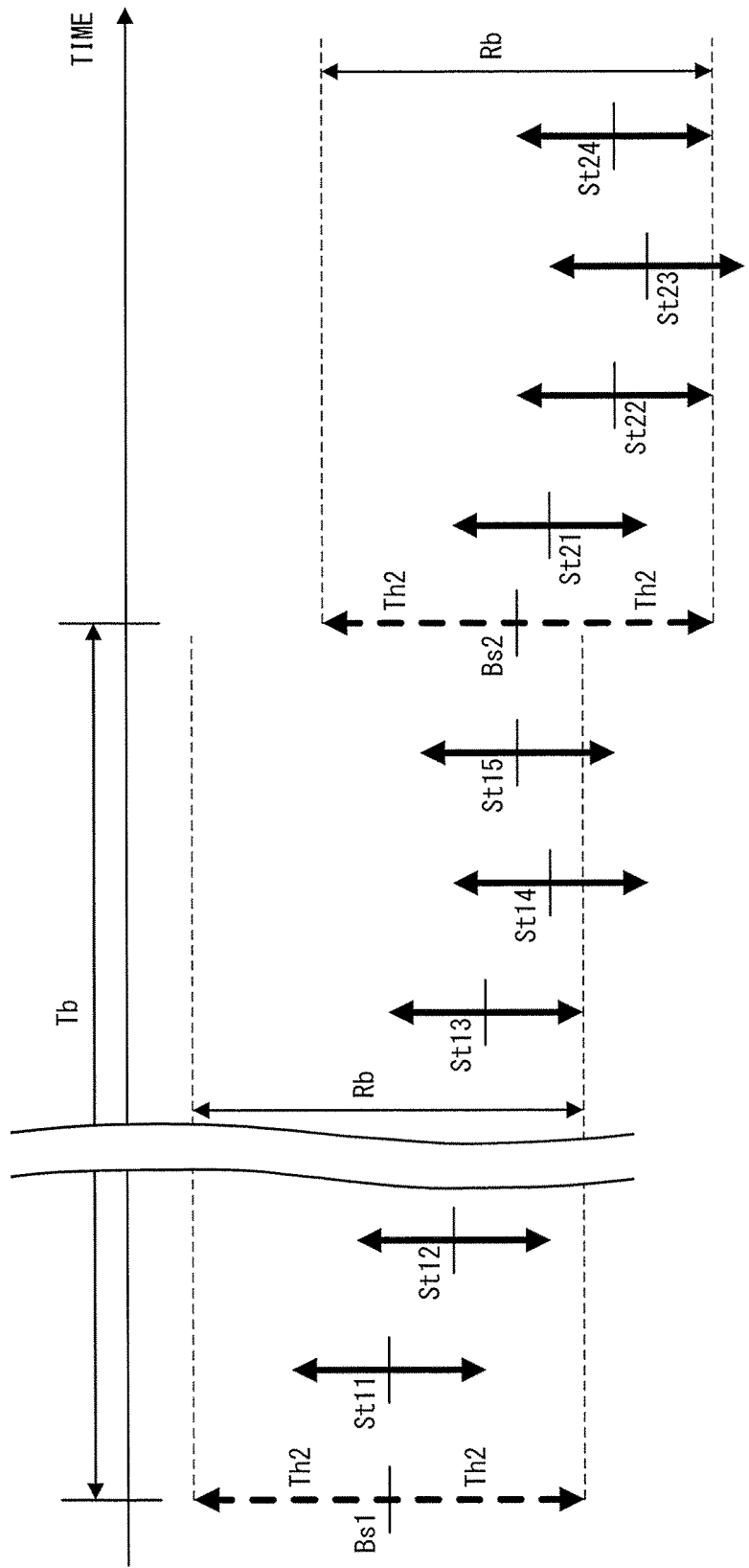
FIG. 15 is a diagram illustrating a change in the standard biological information according to the first embodiment.
Figure 16:
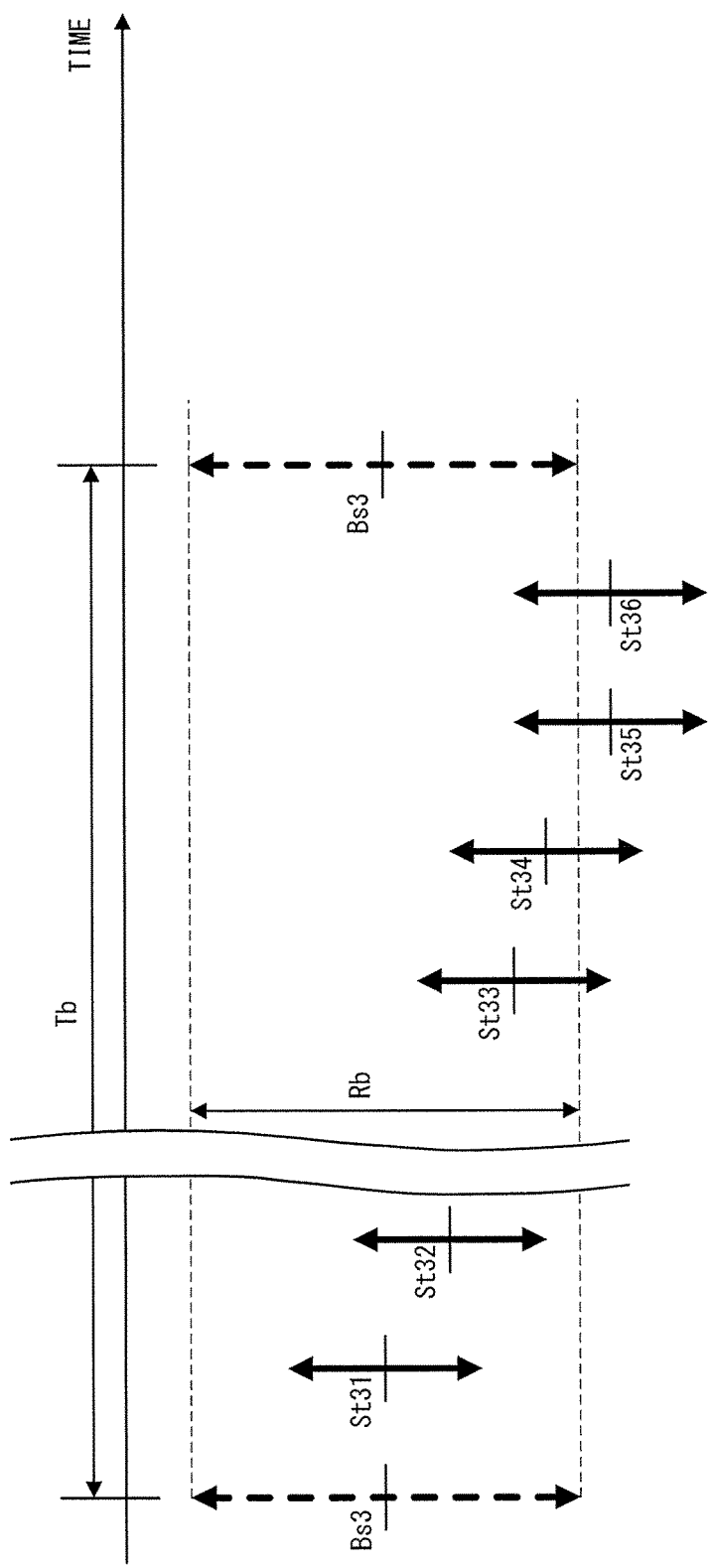
FIG. 16 is a diagram illustrating a change in the standard biological information according to the first embodiment.

FIGS. 9 to 11 are diagrams for explaining the process of updating the standard biological information by the standard biological information updating unit 134 according to the first embodiment. FIGS. 12 and 13 are diagrams for explaining the process of updating the basic biological information by the basic biological information updating unit 136 according to the first embodiment. FIGS. 14 to 16 are diagrams showing a change in the standard biological information according to the first embodiment.

Note that in FIGS. 9 to 16, the thick solid arrow indicates the magnitude of the threshold Th1 based on the standard value. In other words, each of the length of the upward thick solid arrow starting from the standard value and the length of the downward thick solid arrow starting from the standard value corresponds to the magnitude of the threshold Th1. To put it another way, the range from the leading end of the upward thick solid arrow to the leading end of the downward thick solid arrow corresponds to 2*Th1 (twice the threshold Th1). Assuming that the range of 2*Th1 based on the standard value is set as the range Ra, when the current value falls within the range Ra, the authentication is established. In other words, the range Ra corresponds to the authenticatable range.

In FIGS. 9 to 16, the thick dashed arrow indicates the magnitude of the threshold Th2 based on the basic value. In other words, each of the length of the upward thick dashed arrow starting from the basic value and the length of the downward thick dashed arrow starting from the basic value corresponds to the magnitude of the threshold Th2. To put it another way, the range from the leading end of the upward thick dashed arrow to the leading end to the downward thick dashed arrow corresponds to 2*Th2 (twice the threshold Th2). Assuming that the range of 2*Th2 based on the basic value is set as a range Rb, when the current value or the standard value falls within the range Rb, the standard value is updated. Further, when the period Tb has elapsed and the standard value falls within the range Rb, the basic value is updated. In other words, the range Rb is the growth following range. As shown in FIG. 9 and the like, the threshold Th1 is smaller than the threshold Th2. In other words, the range Ra (authenticatable range) is smaller than the range Rb (growth following range).

FIG. 9(a) illustrates a state where the difference between the standard value and the current value is less than the threshold Th1; the difference between the basic value and the current value is less than the threshold Th2; and the difference between the basic value and the standard value is less than the threshold Th2. In this case, since the difference between the standard value and the current value is less than the threshold Th1 (i.e., the current value falls within the range Ra), the authentication for the current value is established (YES in S106, S120 shown in FIG. 7). Further, since the difference between the basic value and the current value is less than the threshold Th2 (i.e., the current value falls within the range Rb), as shown in FIG. 9(b), the standard biological information updating unit 134 updates the standard value with the current value (YES in S122, S124 shown in FIG. 7).

FIG. 10(a) illustrates a state where the difference between the standard value and the current value is less than the threshold Th1; the difference between the basic value and the current value is equal to or greater than the threshold Th2; and the difference between the basic value and the standard value is less than the threshold Th2. In this case, since the difference between the standard value and the current value is less than the threshold Th1, the authentication for the current value is established (YES in S106, S120 shown in FIG. 7). Further, the difference between the basic value and the current value is equal to or greater than the threshold Th2 (i.e., the current value does not fall within the range Rb). However, since the difference between the basic value and the standard value is less than the threshold Th2 (i.e., the standard value falls within the range Rb), as shown in FIG. 10(b), the standard biological information updating unit 134 updates the standard value with the current value (NO in S122, YES in S126, S124 shown in FIG. 7). In this case, as shown in FIG. 10(b), the difference between the basic value and the standard value is equal to or greater than the threshold Th2 (i.e., the standard value does not fall within the range Rb). In this state, as shown in FIG. 10(c), when the current value falls within the range Ra and deviates from the range Rb, the authentication is established (YES in S106, S120 shown in FIG. 7), but the standard biological information updating unit 134 does not update the standard value (NO in S122, NO in S126, S110 shown in FIG. 7).

FIG. 11(a) illustrates a state where the difference between the standard value and the current value is less than the threshold Th1; the difference between the basic value and the current value is less than the threshold Th2; and the difference between the basic value and the standard value is equal to or greater than the threshold Th2. In this case, since the difference between the standard value and the current value is less than the threshold Th1 (i.e., the current value falls within the range Ra), the authentication for the current value is established (YES in S106, S120 shown in FIG. 7). Further, since the difference between the basic value and the current value is less than the threshold Th2 (i.e., the current value falls within the range Rb), as shown in FIG. 11(b), the standard biological information updating unit 134 updates the standard value with the current value (YES in S122, S124 shown in FIG. 7). Accordingly, the standard value falls within the range Rb. In other words, even when the standard value deviates from the range Rb, as shown in FIG. 10(c), the difference between the basic value and the current value becomes less than the threshold Th2, which allows the standard value to fall within the range Rb.

FIG. 12(a) illustrates a state where the difference between the basic value and the standard value is less than the threshold Th2. In this case, since the difference between the basic value and the standard value is less than the threshold Th2 (i.e., the standard value falls within the range Rb), as shown in FIG. 12(b), the basic biological information updating unit 136 updates the basic value with the standard value (YES in S204, S206 shown in FIG. 8). On the other hand, FIG. 13(a) illustrates a state where the difference between the basic value and the standard value is equal to or greater than the threshold Th2. In this case, as shown in FIG. 13(b), the basic biological information updating unit 136 does not update the basic value with the standard value (No in S204, S208 shown in FIG. 8).

FIG. 14 illustrates a state where the standard value changes in accordance with a change of the current value in the period Tb. Like standard values St1 to St4, in the case where the authentication for the current value is established, when the difference between the basic value and the current value is less than the threshold Th2 (i.e., the current value falls within the range Rb), the standard value falls within the range Rb. On the other hand, like a current value Cr4, the current value (current biological information) may differ from the basic value by an amount corresponding to the threshold Th2 or more due to a temporary (reversible) change in physical condition (for example, illness) of the user (i.e., the current value deviates from the range Rb). In other words, the biological information may exceed the assumed growth following range due to a temporary change in physical condition. In this case, when the difference between the standard value and the current value is equal to the threshold Th1, the authentication is established. Further, since the standard value St4 falls within the range Rb, the standard biological information updating unit 134 updates the standard value from St4 to St5 (St5=Cr4). Like a current value Cr4', the difference between the standard value and the current value may become equal to or greater than the threshold Th1 due to, for example, an intense exercise of the user. In such a case, the authentication is not established, and thus the standard value is not updated.

After that, when the current value is Cr5, the difference between the standard value and the current value is less than the threshold Th1 (i.e., the current value Cr5 falls within the range Ra), so that the authentication is established. However, when the difference between the basic value and the current value Cr5 is equal to or greater than the threshold Th2 (i.e., the current value Cr5 deviates from the range Rb) and the difference between the basic value and the standard value St5 is equal to or greater than the threshold Th2 (i.e., the standard value St5 deviates from the range Rb). Accordingly, the standard biological information updating unit 134 does not update the standard value. In other words, a standard value St6 is equal to the standard value St5. To put it another way, this embodiment has a configuration in which when the biological information exceeds the assumed growth following range, the standard value is not updated any more.

After that, when the user has recovered from the temporary change in physical condition and the current value is Cr6 within the range Rb, the difference between the standard value St6 and the current value Cr6 is less than the threshold Th1 (i.e., the current value Cr6 falls within the range Ra), so that the authentication is established. Further, the standard biological information updating unit 134 updates the standard value from St6 to St7 (St7=Cr6). After that, when the current value becomes Cr7 within the range Rb and the authentication is established, the standard biological information updating unit 134 updates the standard value from St7 to St8 (St8=Cr7). In this manner, this embodiment has a configuration in which when the user has recovered from the temporary change in physical condition, the standard value is brought closer to the basic value.

FIG. 15 illustrates a state where the basic value is updated in accordance with a change in the standard value. Referring to FIG. 15, when the basic value is Bs1, the standard value is changed to St11, St12, St13, St14, and St15 in this order. In this case, when the period Tb has elapsed from the update of the basic value with Bs1, the standard value is St15. The difference between the basic value Bs1 and the standard value St15 is less than the threshold Th2. That is, the standard value St15 falls within the range Rb. Accordingly, the basic biological information updating unit 136 updates the basic value from Bs1 to Bs2 (Bs2=St15).

As for the updated basic value Bs2, the standard value changes to St21, St22, St23, and St24 in this order. In this case, the standard values St22, St23, and St24 differ from the basic value Bs1 by an amount corresponding to the threshold Th2 or more. In other words, the standard values deviate from the range Rb for the basic value Bs1. However, in practice, the basic value is updated with Bs2, so that the standard value can be updated with St22, St23, and St24. Thus, even when the biological information is changed due to the normal growth of the living body in a relatively long period, the authentication can be established.

Thus, this embodiment has a configuration in which when the biological information deviates from the basic value within the range based on the threshold Th2 due to the growth of the user during the period Tb, the basic value is updated according to the biological information that deviates from the basic value. In the example of FIG. 15, the standard values St13, St14, and St15 obtained immediately before the period Tb has elapsed are values smaller than the basic value Bs1. Accordingly, the biological information of the user obtained immediately before the period Tb has elapsed tends to be smaller than the basic value Bs1. Therefore, in this embodiment, the basic value is updated with a value smaller than Bs1 in accordance with the tendency. Consequently, the authentication device 100 according to this embodiment can update the basic value so as to follow the normal secular change of the living body in a relatively long period. This makes it possible to suppress an increase in the false rejection ratio due to the secular change of the living body. In other words, in this embodiment, the accuracy of authentication can be improved.

FIG. 16 illustrates a state where the basic value is not updated depending on a change in the standard value due to temporary abnormality in the living body. Referring to FIG. 16, when the basic value is Bs3, the standard value changes to St31, St32, St33, St34, St35, and St36 in this order. In this case, the standard values St35 and St36 are different from the basic value Bs3 by an amount corresponding to the threshold Th2 or more. In other words, the standard values deviate from the range Rb for the basic value Bs3. At this time, in the period corresponding to the standard values St35 and St36, it can be estimated that the biological information temporarily falls outside of the range Rb and changes due to a temporary change in the physical condition of the user. In this case, after a lapse of the period Tb from the update of the basic value with the Bs3, the standard value is St36. In this case, the basic biological information updating unit 136 does not update the basic value. Accordingly, the basic value is kept at Bs3. As described above, when the living body has recovered from the temporary abnormal condition, the basic value can be updated.

Thus, when the difference between the basic value and the standard value is less than the threshold Th2, the basic biological information updating unit 136 according to this embodiment updates the basic value with the standard value. This prevents the basic value from following a change in the biological information due to a temporary abnormal condition of the living body. If the basic value follows a change in the biological information due to temporary abnormality in the living body, there is a possibility that the biological information that does not deviate from the amount of normal secular change of the living body cannot be authenticated after the abnormality condition has recovered. Accordingly, in this embodiment, an increase in the false rejection ratio due to temporary abnormality in the living body can be suppressed. In other words, in this embodiment, the accuracy of authentication can be improved.

The biometric authentication process in the authentication device 100 according to this embodiment is completed inside the authentication device 100. When the authentication is established, the authentication device 100 transmits the key information generated from the identification information of the user to the use terminal 200. This enables the user to receive services without the need to transmit the biological information to the use terminal 200 and the network 20.

If a device connected to the network 20 authenticates the user, the biological information is transmitted to the network 20. In this case, the biological information, which is the personal information of the user, is transmitted to the network 20. In such a case, when the security level of the network 20 is low, leakage of the personal information may be caused due to the transmission of the personal information of the user to the network 20. On the other hand, the authentication device 100 according to this embodiment does not transmit the biological information to the network 20, thereby preventing security problems from occurring. In other words, in this embodiment, the security of the biological information of the user can be secured.

COMPARATIVE EXAMPLES

Next, comparative examples will be described.

Figure 17:
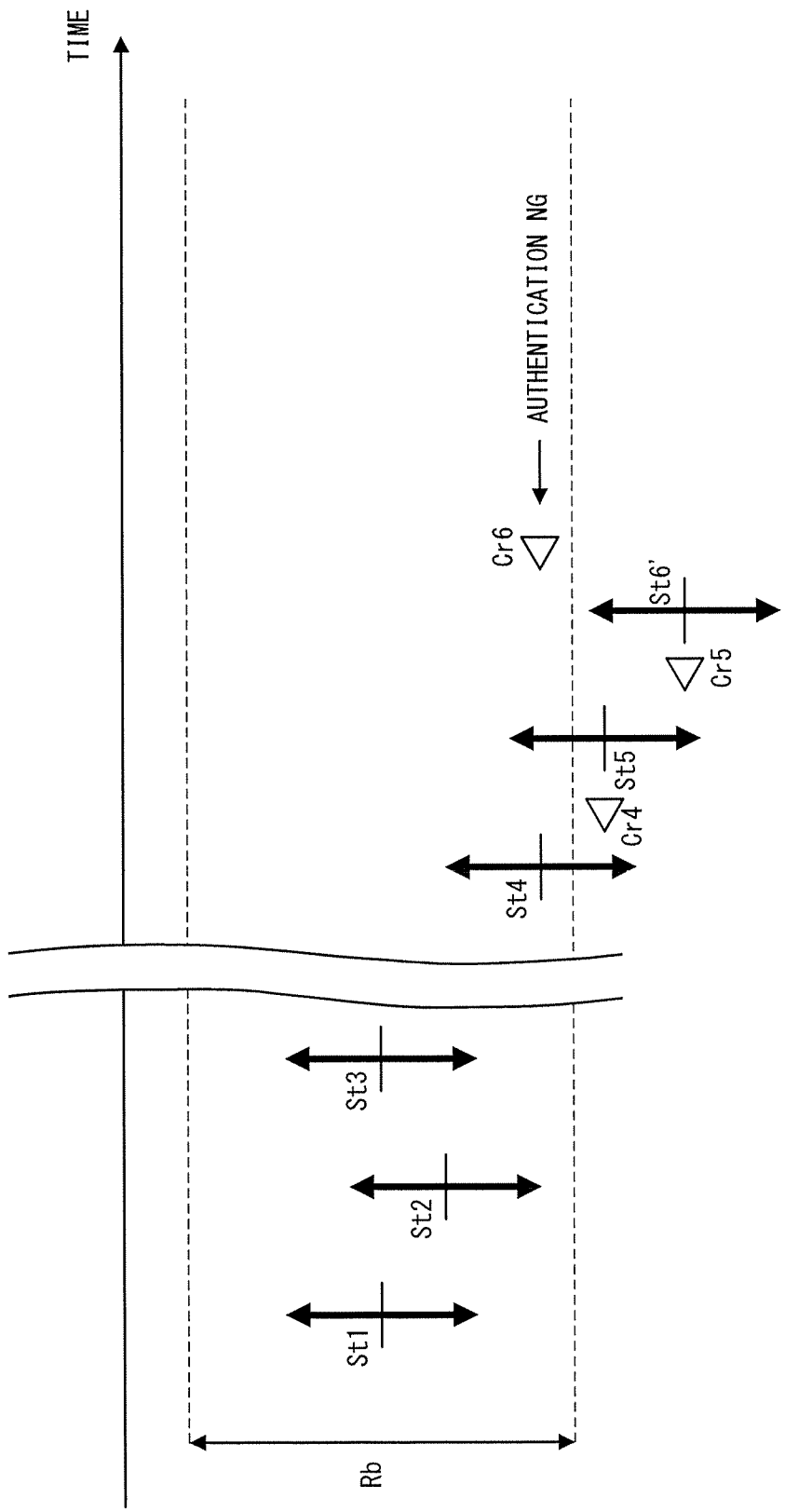
FIG. 17 is a diagram for explaining a first comparative example.

FIG. 17 is a diagram for explaining a first comparative example. In the first comparative example, the standard biological information is updated in a state where the basic biological information is not provided. In this case, St1 to St5 shown in FIG. 17 respectively correspond to St1 to St5 shown in FIG. 14. Similarly, Cr4 to Cr6 shown in FIG. 17 respectively correspond to Cr4 to Cr6 shown in FIG. 14. The range Rb shown in FIG. 17 corresponds to the range Rb shown in FIG. 14.

Like in the example of FIG. 14, the standard values St1 to St4 fall within the range Rb. On the other hand, the current values Cr4 and Cr5 deviate from the range Rb due to a temporary change in the physical condition of the user. Even in this case, as long as the authentication for the current value is established, the standard value can be updated in the direction in which the value substantially differs from the range Rb, like standard values St5 and St6'. In such a case, there is a possibility that the authentication cannot be established when the user has recovered from the temporary change in physical condition and the current value is Cr6 within the range Rb.

On the other hand, in this embodiment, as shown in FIG. 14, when the current value is Cr6, the standard value St6 does not substantially differ from the range Rb. Accordingly, the authentication can be established. Specifically, in this embodiment, the basic biological information is provided and the standard biological information is updated in such a manner that the standard biological information does not substantially deviate from the range Rb that can be set by the basic biological information. Accordingly, the authentication device 100 according to this embodiment can suppress an increase in the false rejection ratio when the biological information changes with time. Thus, in this embodiment, the authentication can be performed accurately even when the biological information changes with time.

Figure 18:
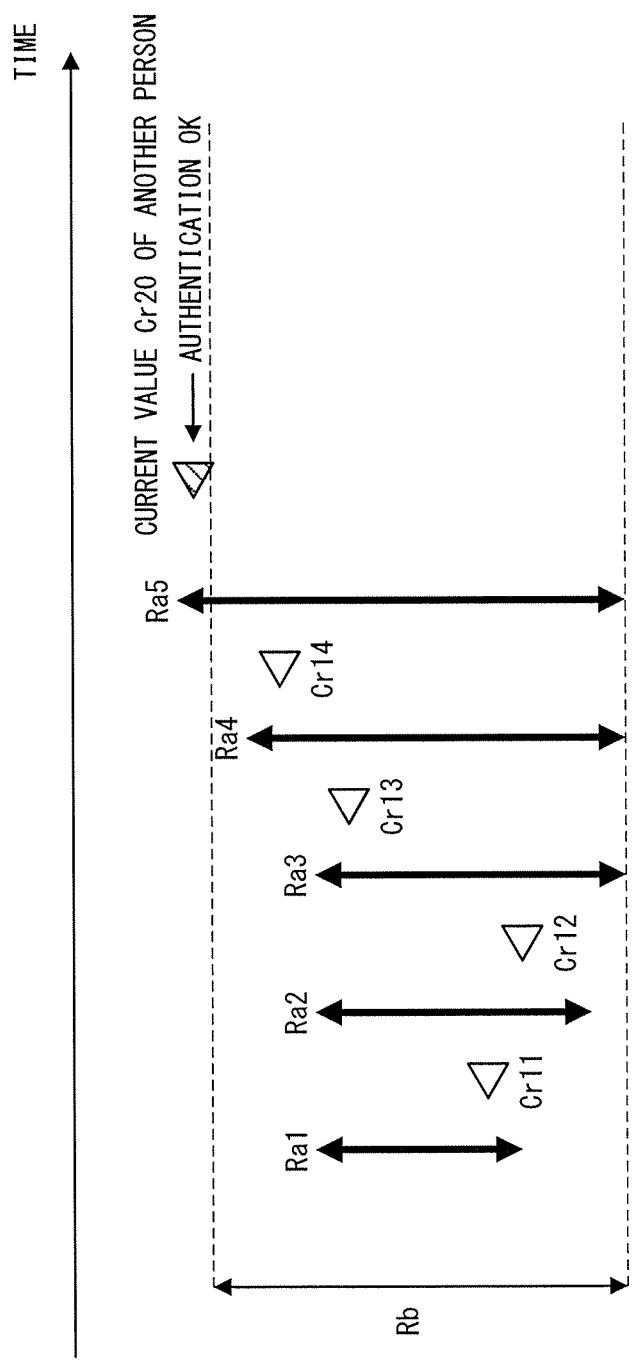
FIG. 18 is a diagram for explaining a second comparative example.

FIG. 18 is a diagram for explaining a second comparative example. In the second comparative example, as the authentication is carried out, the threshold for the standard biological information is expanded. In other words, as the authentication is carried out, the authenticatable range Ra is expanded.

Specifically, when the current value Cr11 is present on the lower side (small value side) in the authenticatable range Ra1, the authentication is established. The authenticatable range is expanded downward and updated from Ra1 to Ra2. Similarly, when the current value Cr12 is present on the lower side in the authenticatable range Ra2, the authentication is established. The authenticatable range is expanded downward and updated from Ra2 to Ra3.

After that, when the current value Cr13 is present on the upper side in the authenticatable range Ra3, the authentication is established. Further, the authenticatable range is expanded upward and updated from Ra3 to Ra4. After that, when the current value Cr14 is present on the upper side in the authenticatable range Ra4, the authentication is established. Further, the authenticatable range is expanded upward and updated from Ra4 to Ra5. At this time, the authenticatable range Ra5 may exceed the growth following range Rb.

In this case, current biological information Cr20 of another person deviates from the growth following range Rb of the person himself/herself, but can fall within the authenticatable range Ra5. In this case, the authentication for the current biological information Cr20 of another person is established. In other words, if the authentication range is expanded as the authentication is carried out, the false acceptance ratio may be increased.

On the other hand, in this embodiment, the threshold Th1 is always smaller than the threshold Th2. In other words, in this embodiment, the authenticatable range is smaller than the growth following range. Accordingly, in this embodiment, an increase in the false acceptance ratio can be suppressed. Therefore, in this embodiment, the authentication can be performed accurately even when the biological information changes with time.

Second Embodiment

Next, a second embodiment will be described. The second embodiment is different from the first embodiment in that a use terminal transfers key information to another use terminal. Note that the network configuration according to the second embodiment is substantially the same as that of the authentication system 10 according to the first embodiment shown in FIG. 2, and thus the description thereof is omitted. Components other than the use terminal of the second embodiment are substantially the same as those of the first embodiment, and thus the descriptions thereof are omitted. The second embodiment which has a configuration as mentioned above can obtain substantially the same advantageous effect as that of the first embodiment, in addition to the advantageous effect to be described later.

Figure 19:
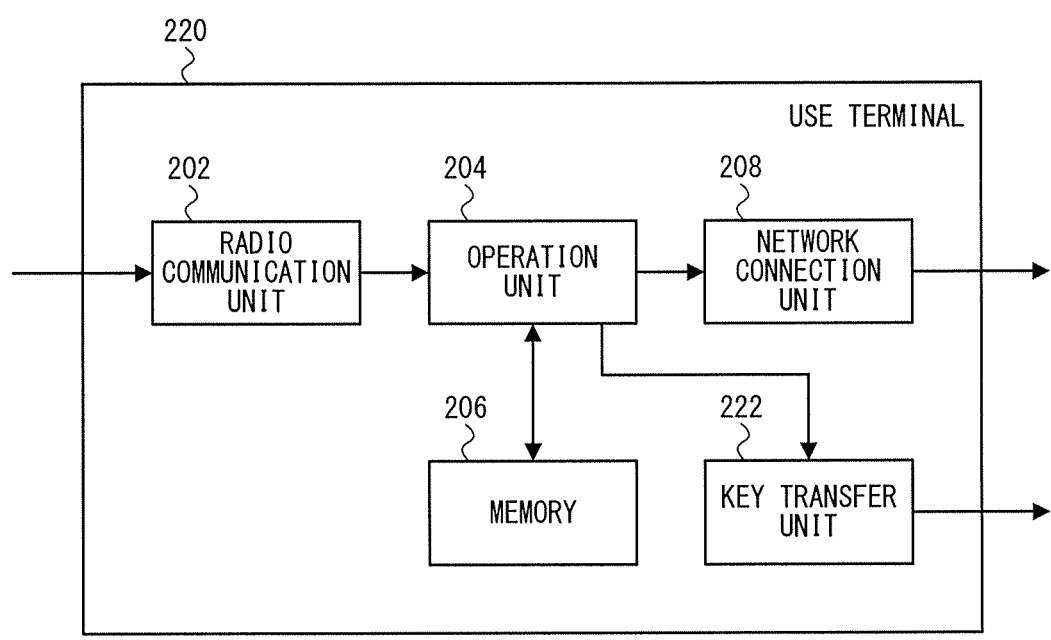
FIG. 19 is a diagram showing a use terminal according to a second embodiment.
Figure 20:
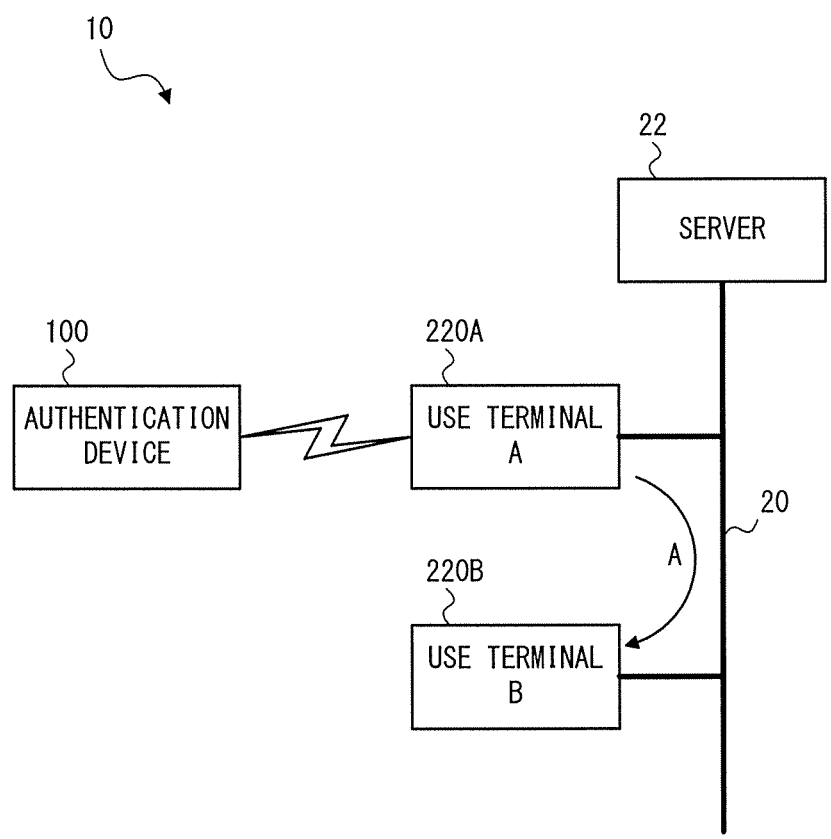
FIG. 20 is a diagram showing a state where a use terminal transfers key information to another use terminal.

FIG. 19 is a diagram showing a use terminal 220 according to the second embodiment. FIG. 20 is a diagram showing a state where the use terminal 220 transfers the key information to another use terminal 220. The use terminal 220 includes the radio communication unit 202, the operation unit 204, the memory 206, the network connection unit 208, and a key transfer unit 222. Components other than the key transfer unit 222 are substantially the same as the components of the use terminal 200 according to the first embodiment, and thus the descriptions are omitted.

The operation unit 204 outputs the key information to the key transfer unit 222. The key transfer unit 222 transfers the key information to another use terminal 200 via the network 20. For example, as shown in FIG. 20, when the use terminal 200A receives the key information from the authentication device 100, the use terminal 200A transfers the key information to the use terminal 200B as indicated by an arrow A. When there are three or more use terminals 200, the use terminal 200A may transfer the key information not only to the use terminal 2003, but also to the other use terminals 200.

Another use terminal 200 (the use terminal 200B in the example of FIG. 20) which has received the key information performs the process for providing services to the user, in the same manner as in the case of receiving the key information from the authentication device 100. Thus, even when the authentication device 100 does not communicate with the use terminal 200B, the user can immediately receive services by using the use terminal 200B.

For example, assume that the use terminal 200A is installed in a room A and the use terminal 200B is installed in a room B. In other words, assume that the use terminal 200B is installed at a location that is physically apart from the use terminal 200A. In this case, if the user moves from the room A to the room B and desires to use the use terminal 200B and the authentication device 100 communicates with the use terminal 200B again, the communication time is wasted and it may be troublesome to the user. On the other hand, in the second embodiment, since the authentication is already established and the use terminal 200A which has received the key information transfers the key information to another use terminal 200B, which is less troublesome to the user.

Third Embodiment

Next, a third embodiment will be described. The third embodiment is different from other embodiments in that a security code is added to key information. The network configuration according to the third embodiment is substantially similar to that of the authentication system 10 shown in FIG. 2, and thus the description thereof is omitted. Components other than the personal authentication unit 120 of the third embodiment are substantially the same as those of the first embodiment, and thus the descriptions thereof are omitted. Note that the third embodiment which has a configuration as mentioned above provides substantially the same advantageous effect as that of the first embodiment, in addition to the advantageous effect to be described later.

Figure 21:
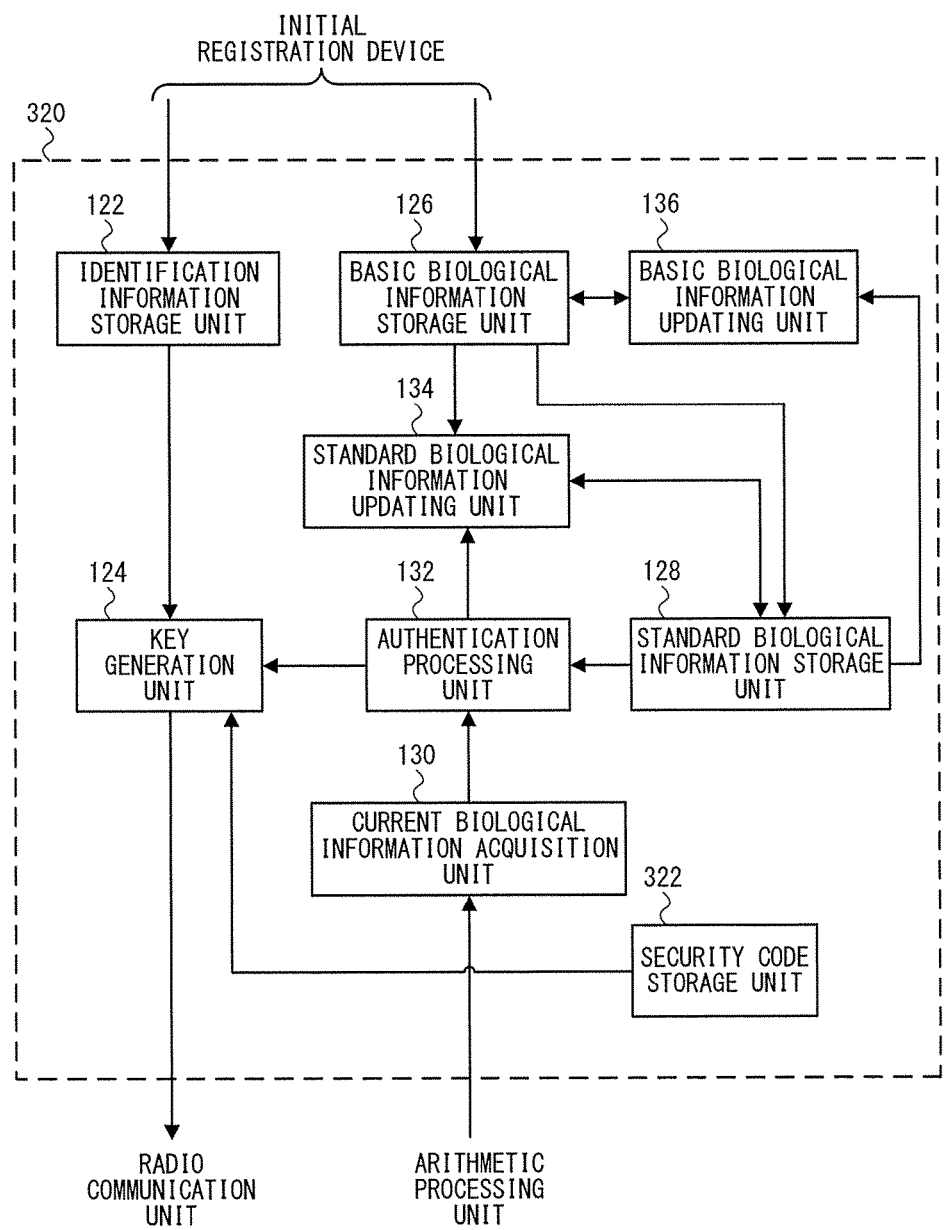
FIG. 21 is a diagram showing a personal authentication unit according to a third embodiment.

FIG. 21 is a diagram showing a personal authentication unit 320 according to the third embodiment. The personal authentication unit 320 includes the identification information storage unit 122, the key generation unit 124, the basic biological information storage unit 126, the standard biological information storage unit 128, the current biological information acquisition unit 130, the authentication processing unit 132, the standard biological information updating unit 134, the basic biological information updating unit 136, and a security code addition unit 322. Components other than the security code addition unit 322 are substantially similar to the components of the personal authentication unit 120 shown in FIG. 6, and thus the descriptions thereof are omitted.

The security code addition unit 322 preliminarily stores the security code. When the key generation unit 124 generates key information, the security code addition unit 322 adds the security code to the key information. Specifically, when the key information is output, the key generation unit 124 outputs the key information to which the security code is added. Accordingly, the information to which the security code is added is transmitted from the authentication device 100 to the use terminal 200.

In this case, the security code is information indicating a security level. The security code addition unit 322 adds, to the key information, the security code corresponding to the security level of the authentication device 100 itself. Further, the security code can indicate the security level of the network and the device through which the key information has passed. In other words, every time the key information passes through the network 20 and the device, such as the use terminal 200, the security codes corresponding to the respective security levels are added to the information. Alternatively, every time the key information passes through the use terminal 200 and the network 20, the security codes are updated with the codes corresponding to the respective security levels. Accordingly, the key information which has passed through one of the network and the device having different security levels has a different security code which is added to the key information that has reached the server 22. In other words, if the pass from the authentication device 100 to the server 22 varies, the security code added to the key information that has reached the server 22 may also vary.

Thus, based on the security code added to the key information, the server 22 can determine the security level of the path through which the key information has passed. Further, the server 22 can reject the provision of services related to the key information which has passed through a path with a low security level. Further, the server 22 can reject the provision of services related to the key information from the authentication device 100 with a low security level. Furthermore, the server 22 can reject the provision of services to the use terminal 200 with a low security level. Therefore, in the third embodiment, the security in providing services can be secured.

MODIFIED EXAMPLES

Note that the present invention is not limited to the above embodiments and can be modified as appropriate without departing from the scope of the invention. For example, the above-described embodiments can be applied to each other. Further, in the flowcharts in the above embodiments, the order of processes can be changed as appropriate. For example, in FIG. 7, the process of S122 and the process of S126 may be replaced. Further, in FIG. 7, the process of S102 may be carried out after the process of S124 and the process of S110. Similarly, in FIG. 8, the process of S202 may be performed after the process of S206 and the process of S208.

In the embodiments described above, the biological information used for biometric authentication is electrocardiogram information, but the biological information is not limited to this configuration. The biometric authentication can be performed using any biological information other than the above-described biological information. This embodiment is especially effective when the biological information can be changed depending on human activities.

In the embodiments described above, the authentication device 100 stores the biological information (electrocardiogram information) obtained from the electrocardiographic waveform detected by the sensor unit 104, but may store the electrocardiographic waveform. In other words, the authentication device 100 may store not only the biological information used for biometric authentication, but also raw data (data detected by the sensor unit 104) on which the biological information is based. The raw data can be used for healthcare and the like. The authentication device 100 may include sensors (such as an acceleration sensor, a piezoelectric sensor, and a luminance sensor) other than the sensor for acquiring the biological information. In other words, the authentication device 100 may have functions other than the function for the authentication process.

In the embodiment described above, as shown in FIG. 7, if the difference between the basic value and the current value is not less than the threshold Th2, the standard biological information updating unit 134 updates the standard value when the difference between the basic value and the standard value is less than the threshold Th2. However, the updating process is not limited to this configuration.

Figure 22:
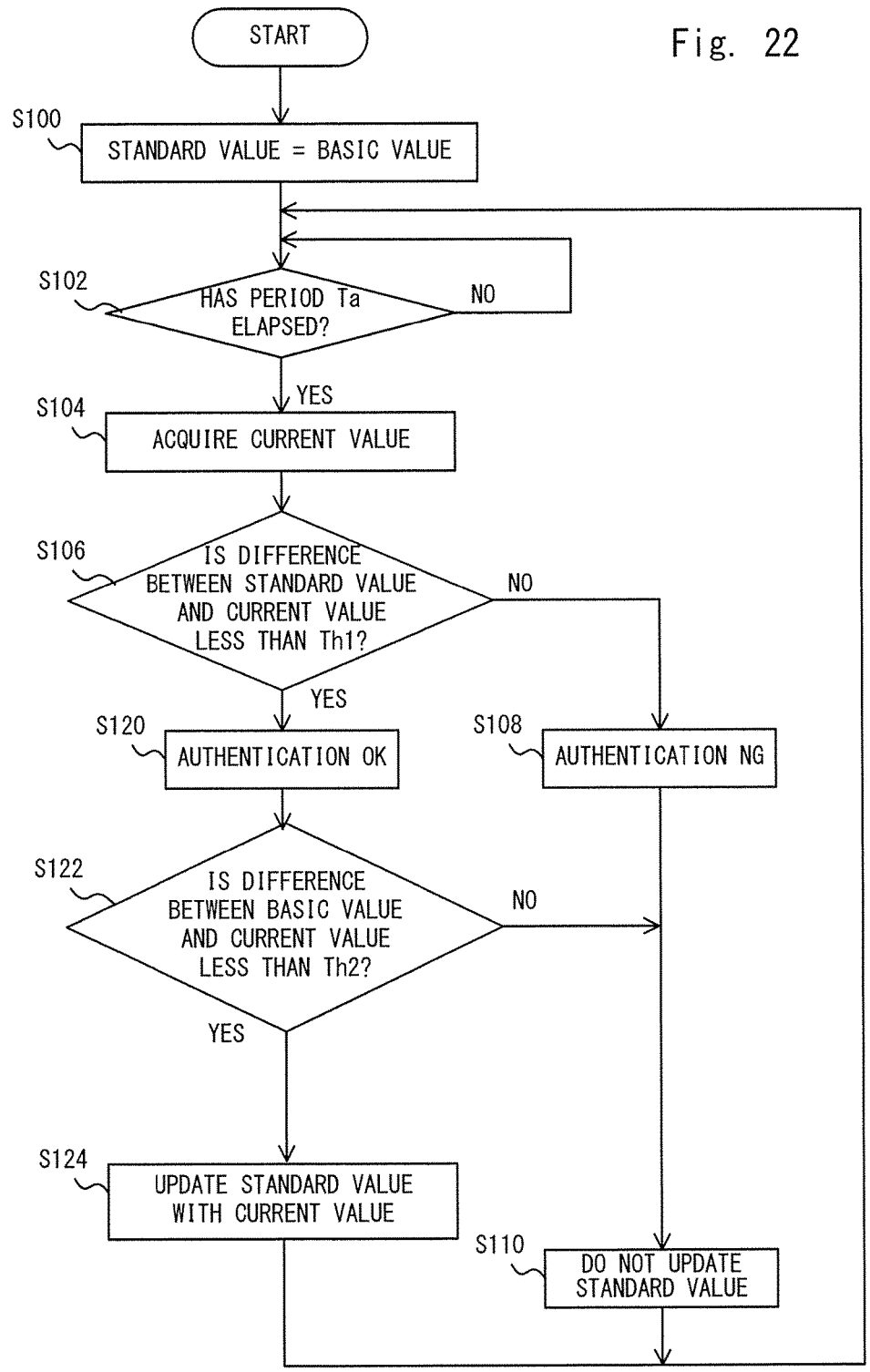
FIG. 22 is a flowchart showing an authentication process and a standard biological information updating process according to a modified example.

FIG. 22 is a flowchart showing an authentication process and a standard biological information updating process according to a modified example. Unlike in FIG. 7, the flowchart shown in FIG. 22 does not include the process of S126. The other processes of the flowchart shown in FIG. 22 are similar to the processes shown in FIG. 7. In the example of FIG. 22, when the difference between the basic value and the current value is not less than the threshold Th2, the standard value is not updated. In this case, the difference between the basic value and the standard value is not equal to or greater than the threshold Th2. Accordingly, the process of S204 shown in FIG. 8 is omitted. In other words, when the period Tb has elapsed from the update of the previous basic value, the basic value is updated with the standard value without fail. This configuration allows the standard value to always fall within the range Rb (growth following range), which makes it possible to perform authentication by following the growth of the human.

On the other hand, in the above-mentioned case, the standard value does not deviate from the growth following range. Accordingly, if the physical condition of the user is temporarily changed, there is a possibility that even the normal user cannot be authenticated. To put it the other way around, like in S122 and S126 shown in FIG. 7, the configuration in which the standard value is updated when the difference between the basic value and the current value, or the difference between the basic value and the standard value is less than the threshold Th2 makes it possible to suppress an increase in the false rejection ratio even when the physical condition of the user is temporarily changed.

In the embodiments described above, if the basic value is not updated in S208 shown in FIG. 8, the basic value is updated when the difference between the standard value and the basic value is less than the threshold Th2. However, the updating process is not limited to this configuration. The basic value may be updated after a lapse of the period Tb from the process in which the basic value is not updated (NO in S204, S208 shown in FIG. 8), when the basic value has not been previously updated.

The period Tb (first period) is not necessarily a predetermined "time". The process for updating the basic value may be performed when the number of times of authentication is equal to or more than a predetermined number. In this case, the period Tb corresponds to the number of times of authentication. Also in this case, the process for updating the basic value can be performed at a time interval longer than the time interval at which the authentication process is performed.

In the embodiments described above, the use terminal 200 is connected to the network 20, but the use terminal 200 is not limited to this configuration. The use terminal 200 need not necessarily be connected to the network 20, as long as the use terminal 200 can provide services without using the server 22.

Further, the standard biological information updating unit need not necessarily update the standard biological information so as to completely match the current biological information for which authentication is established. For example, the standard biological information updating unit my update the standard biological information with the value obtained by adding a small margin to the current biological information for which authentication is established. Similarly, the basic biological information updating unit need not necessarily update the basic biological information so as to completely match the standard biological information. For example, the basic biological information updating unit may update the basic biological information with the value obtained by adding a small margin to the standard biological information.

The invention made by the present inventors has been described above based on embodiments. However, the present invention is not limited to the above embodiments and can be modified in various ways without departing from the gist of the invention.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An authentication device comprising:
an acquisition unit configured to acquire biological information of a user;
an authentication processing unit configured to perform an authentication process by comparing current biological information with a standard biological information about the user, the current biological information being the acquired biological information;
a storage unit configured to store the standard biological information and basic biological information about the user, the basic biological information being registered in advance; and
a standard biological information updating unit configured to perform a process for updating the standard biological information based on the basic biological information, wherein when a difference between the standard biological information and the current biological information is less than a predetermined first threshold, the authentication processing unit determines that authentication is established, when a difference between the basic biological information and the current biological information is equal to or greater than a predetermined second threshold and a difference between the basic biological information and the standard biological information is less than the predetermined second threshold, the standard biological information updating unit updates the standard biological information according to the current biological information for which the authentication is established.

2. The authentication device according to claim 1, further comprising a basic biological information updating unit configured to perform a process for updating the biological information according to the standard biological information at a time interval longer than a time interval at which the authentication process is performed.

3. The authentication device according to claim 2, wherein when the difference between the basic biological information and the standard biological information is less than the second threshold, the basic biological information updating unit updates the basic biological information according to the standard biological information.

4. The authentication device according to claim 1, wherein the first threshold is smaller than the second threshold.

5. The authentication device according to claim 1, wherein when the difference between the basic biological information and the current biological information is less than the second threshold, the standard biological information updating unit updates the standard biological information according to the current biological information for which the authentication is established.

6. The authentication device according to claim 1, wherein when the difference between the basic biological information and the current biological information is equal to or greater than the predetermined second threshold and the difference between the basic biological information and the standard biological information is equal to or greater than the predetermined second threshold, the standard biological information updating unit does not update the standard biological information.

7. The authentication device according to claim 1, further comprising:
a key generation unit configured to generate key information when authentication is established by the authentication processing unit; and
a radio communication unit configured to transmit the generated key information by radio transmission to an opposing device connected to a network.

8. The authentication device according to claim 7, further comprising a security code addition unit configured to add a security code to the key information,
wherein the radio communication unit transmits the key information by radio transmission to the opposing device, the security code being added to the key information.

9. The authentication device according to claim 1, wherein when a predetermined period has elapsed from the authentication, the acquisition unit acquires new biological information.

10. The authentication device according to claim 1, wherein the authentication device is a portable device.

11. The authentication device according to claim 1, wherein the predetermined first threshold value is used for authentication and the predetermined second threshold value is used for updating determination of the standard biological information.

12. The authentication device according to claim 1, wherein the difference between the standard biological information and the current biological information is equal to or greater than the predetermined first threshold, the standard biological information updating unit does not update the standard biological information.

13. An authentication system comprising:
an authentication device configured to perform authentication of a user; and
at least one use terminal connected to a network, the use terminal being used to provide the user with a service, wherein
the authentication device includes:
an acquisition unit configured to acquire biological information about the user;
an authentication processing unit configured to perform an authentication process by comparing current biological information with standard biological information about the user, the current biological information being the acquired biological information;
a storage unit configured to store the standard biological information and basic biological information about the user, the basic biological information being registered in advance; and
a standard biological information updating unit configured to perform a process for updating the standard biological information based on the basic biological information,
when a difference between the standard biological information and the current biological information is less than a predetermined first threshold, the authentication processing unit determines that authentication is established, and
when a difference between the basic biological information and the current biological information is equal to or greater than a predetermined second threshold and a difference between the basic biological information and the standard biological information is less than the predetermined second threshold, the standard biological information updating unit updates the standard biological information according to the current biological information for which the authentication is established.

14. The authentication system according to claim 13, wherein the authentication device further includes:
a key generation unit configured to generate key information when authentication is established by the authentication processing unit; and
a radio communication unit configured to transmit the generated key information by radio transmission to the use terminal, and
the use terminal uses the key information transmitted from the authentication device, and performs a process for providing a service.

15. The authentication system according to claim 14, wherein the authentication system includes a plurality of the use terminals, and
one of the plurality of use terminals transfers, to another use terminal, the key information transmitted from the authentication device.

16. The authentication system according to claim 14, wherein the authentication device further includes a security code addition unit configured to add a security code to the key information, and
the radio communication unit transmits the key information to the use terminal by radio transmission, the security code being added to the key information.

17. An authentication method comprising:
acquiring biological information about a user;
storing standard biological information used for an authentication process, and basic biological information about the user, the basic biological information being registered in advance;
determining that authentication is established when a difference between the standard biological information and current biological information as the acquired biological information is smaller than a predetermined first threshold; and
updating the standard biological information according to the current biological information for which the authentication is established, when a difference between the basic biological information and the current biological information is equal to or greater than a predetermined second threshold and a difference between the basic biological information and the standard biological information is less than the predetermined second threshold.

18. The authentication method according to claim 17, further comprising performing a process for updating the basic biological information according to the standard biological information at a time interval longer than a time interval at which the authentication process is performed.

19. The authentication method according to claim 18, wherein when the difference between the basic biological information and the standard biological information is less than the second threshold, the basic biological information is updated according to the standard biological information.

20. The authentication method according to claim 17, wherein the first threshold is smaller than the second threshold.

* * * * *